United States Patent
Ouderkirk et al.

(10) Patent No.: US 8,654,444 B2
(45) Date of Patent: Feb. 18, 2014

(54) POLARIZATION CONVERTING COLOR COMBINER

(75) Inventors: Andrew J. Ouderkirk, Singapore (SG); Charles L. Bruzzone, Woodbury, MN (US); Philip E. Watson, Singapore (SG); Stephen J. Willett, St. Paul, MN (US); Dale R. Lutz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 152 days.

(21) Appl. No.: 13/129,884

(22) PCT Filed: Nov. 2, 2009

(86) PCT No.: PCT/US2009/062939
§ 371 (c)(1),
(2), (4) Date: Jun. 15, 2011

(87) PCT Pub. No.: WO2010/059412
PCT Pub. Date: May 27, 2010

(65) Prior Publication Data
US 2011/0242653 A1    Oct. 6, 2011

Related U.S. Application Data

(60) Provisional application No. 61/116,072, filed on Nov. 19, 2008.

(51) Int. Cl.
*G02B 5/30* (2006.01)

(52) U.S. Cl.
USPC .................................................... 359/487.04

(58) Field of Classification Search
USPC ............. 359/495, 486.01, 618, 831, 487.04, 359/487.01, 483.01, 485.01, 485.02, 359/485.06, 489.01, 489.08, 489.09, 359/489.15, 489.16, 491.01, 487.05; 349/1, 349/5, 8, 9, 11; 362/19; 353/20, 28, 30, 34, 353/81, 82
See application file for complete search history.

(56) References Cited

U.S. PATENT DOCUMENTS

| | | | | |
|---|---|---|---|---|
| 3,497,283 | A | * | 2/1970 | Law ........................ 359/487.04 |
| 5,067,799 | A | | 11/1991 | Gold et al. |
| 5,740,288 | A | * | 4/1998 | Pan ................................ 385/11 |
| 5,962,114 | A | | 10/1999 | Jonza et al. |
| 6,490,087 | B1 | | 12/2002 | Fulkerson et al. |
| 6,550,919 | B1 | | 4/2003 | Heine |
| 6,583,833 | B1 | | 6/2003 | Kashima |

(Continued)

FOREIGN PATENT DOCUMENTS

| JP | 2004-020621 | 1/2004 |
|---|---|---|
| JP | 2005-3825 | 1/2005 |

(Continued)

*Primary Examiner* — Alessandro Amari
*Assistant Examiner* — Jie Lei
(74) *Attorney, Agent, or Firm* — Robert V. Heiti

(57) ABSTRACT

Optical elements, color combiners using the optical elements, and image projectors using the color combiners are described. The optical elements can be configured as color combiners that receive different wavelength spectrums of light and produce a combined light output that includes the different wavelength spectrums of light. In one aspect, the received light inputs are unpolarized, and the combined light output is polarized in a desired state. The optical elements are configured to minimize the passage of light which may be damaging to wavelength-sensitive components in the light combiner. Image projectors using the color combiners can include imaging modules that operate by reflecting or transmitting polarized light.

20 Claims, 21 Drawing Sheets

(56) References Cited

U.S. PATENT DOCUMENTS

| | | |
|---|---|---|
| 6,636,276 B1 | 10/2003 | Rosenbluth |
| 6,721,096 B2 | 4/2004 | Bruzzone et al. |
| 6,857,747 B2 | 2/2005 | Pentico et al. |
| 7,059,728 B2 * | 6/2006 | Alasaarela et al. ............. 353/94 |
| 7,261,418 B2 * | 8/2007 | Ma et al. ......................... 353/20 |
| 7,360,900 B2 | 4/2008 | Sakata et al. |
| 2002/0154420 A1 | 10/2002 | Magarill et al. |
| 2003/0184864 A1 | 10/2003 | Bruzzone et al. |
| 2003/0227680 A1 | 12/2003 | Chen et al. |
| 2004/0101150 A1 * | 5/2004 | Hooley et al. ................ 381/190 |
| 2004/0207919 A1 | 10/2004 | Chen et al. |
| 2005/0200812 A1 * | 9/2005 | Sakata et al. ................... 353/20 |
| 2006/0007538 A1 | 1/2006 | Robinson |
| 2006/0007539 A1 | 1/2006 | Mihalakis |
| 2006/0028620 A1 | 2/2006 | Conner |
| 2006/0028729 A1 | 2/2006 | Nishiwaki et al. |
| 2006/0164857 A1 | 7/2006 | Morejon et al. |
| 2006/0171035 A1 | 8/2006 | Berman et al. |
| 2007/0247694 A1 * | 10/2007 | Li ................................ 359/238 |
| 2008/0018861 A1 | 1/2008 | Schuck et al. |
| 2008/0231953 A1 | 9/2008 | Young |
| 2008/0266526 A1 | 10/2008 | Kodama et al. |
| 2008/0285129 A1 | 11/2008 | Magarill et al. |
| 2011/0007392 A1 * | 1/2011 | English et al. ................ 359/495 |

FOREIGN PATENT DOCUMENTS

| | | |
|---|---|---|
| JP | 2007-011179 | 1/2007 |
| WO | 94/25894 | 11/1994 |
| WO | WO 2004/114003 | 12/2004 |
| WO | WO 2006/124993 | 11/2006 |

* cited by examiner

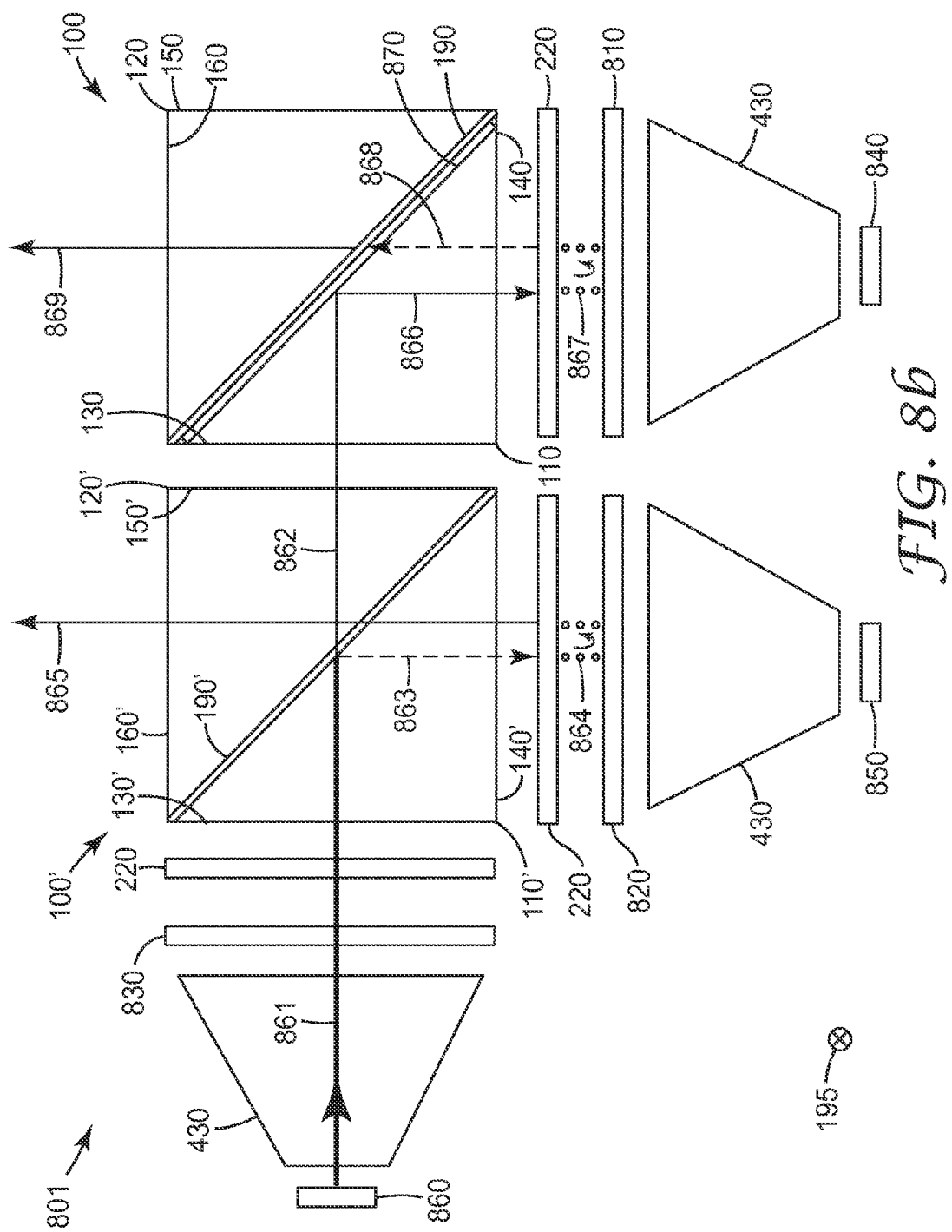
FIG. 8б

POLARIZATION CONVERTING COLOR COMBINER

CROSS REFERENCE TO RELATED APPLICATIONS

This application is a national stage filing under 35 U.S.C. 371 of PCT/US2009/062939, filed Nov. 2, 2009, which claims priority to U.S. Application No. 61/116,072, filed Nov. 19, 2008, the disclosure of which is incorporated by reference in its entirety herein.

BACKGROUND

Projection systems used for projecting an image on a screen can use multiple color light sources, such as light emitting diodes (LED's), with different colors to generate the illumination light. Several optical elements are disposed between the LED's and the image display unit to combine and transfer the light from the LED's to the image display unit. The image display unit can use various methods to impose an image on the light. For example, the image display unit may use polarization, as with transmissive or reflective liquid crystal displays.

Still other projection systems used for projecting an image on a screen can use white light configured to imagewise reflect from a digital micro-mirror array, such as the array used in Texas Instruments' Digital Light Processor (DLP®) displays. In the DLP® display, individual mirrors within the digital micro-mirror array represent individual pixels of the projected image. A display pixel is illuminated when the corresponding mirror is tilted so that incident light is directed into the projected optical path. A rotating color wheel placed within the optical path is timed to the reflection of light from the digital micro-mirror array, so that the reflected white light is filtered to project the color corresponding to the pixel. The digital micro-mirror array is then switched to the next desired pixel color, and the process is continued at such a rapid rate that the entire projected display appears to be continuously illuminated. The digital micro-mirror projection system requires fewer pixelated array components, which can result in a smaller size projector.

Image brightness is an important parameter of a projection system. The brightness of color light sources and the efficiencies of collecting, combining, homogenizing and delivering the light to the image display unit all affect brightness. As the size of modern projector systems decreases, there is a need to maintain an adequate level of output brightness while at the same time keeping heat produced by the color light sources at a low level that can be dissipated in a small projector system. There is a need for a light combining system that combines multiple color lights with increased efficiency to provide a light output with an adequate level of brightness without excessive power consumption by light sources. There is also a need for a light combining system that directs light of different wavelength spectra in a manner to minimize the degradation of the wavelength-sensitive components in the light combiner.

SUMMARY

Generally, the present description relates to high-durability optical elements, color combiners using the optical elements, and image projectors using the color combiners. In one aspect, an optical element includes a first color-selective dichroic filter having a first input surface, disposed to transmit a first light beam perpendicular to the first input surface. The optical element further includes a second color-selective dichroic filter having a second input surface, disposed to transmit a second light beam perpendicular to the second input surface. The optical element further includes a reflective polarizer, disposed to intercept the first light beam and the second light beam at an angle of approximately 45 degrees, a first retarder disposed facing the first color-selective dichroic filter, and a second retarder disposed facing the second color-selective dichroic filter. The reflective polarizer and the retarders are disposed to convert a second polarization state of the first and second light beam into a first polarization state of the first and second light beams, respectively.

In another aspect, an optical element includes a first color-selective dichroic filter having a first input surface, disposed to transmit a first light beam perpendicular to the first input surface. The optical element further includes a second color-selective dichroic filter having a second input surface, disposed to transmit a second light beam perpendicular to the second input surface. The optical element further includes a first reflective polarizer disposed to intercept the first light beam at an angle of approximately 45 degrees, and a second reflective polarizer disposed to intercept the second light beam at an angle of approximately 45 degrees. The optical element still further includes a first retarder disposed facing the first color-selective dichroic filter and a second retarder disposed facing the second color-selective dichroic filter. The first and second reflective polarizers and the first and second retarders are disposed to convert a second polarization state of the first and second light beam into a first polarization state of the first and second light beams, respectively.

In yet another aspect, an optical element includes a first color-selective dichroic filter having a first input surface, disposed to transmit a first light beam perpendicular to the first input surface; a second color-selective dichroic filter having a second input surface, disposed to transmit a second light beam perpendicular to the second input surface; and a third color-selective dichroic filter having a third input surface, disposed to transmit a third light beam perpendicular to the third input surface. The optical element further includes a first reflective polarizer disposed to intercept the first light beam and the second light beam at an angle of approximately 45 degrees, and a second reflective polarizer disposed to intercept the third light beam at an angle of approximately 45 degrees. The optical element further includes a reflector disposed so that a line normal to the reflector intercepts the second reflective polarizer at an angle of approximately 45 degrees. The optical element still further includes a first, a second, a third and a fourth retarder disposed facing each of the first, second and third color-selective dichroic filters, and reflector, respectively. The first and second reflective polarizers and the retarders are disposed to convert a second polarization state of the first, second and third light beam into a first polarization state of the first, second and third light beams, respectively.

In yet another aspect, an optical element includes a first color-selective dichroic filter having a first input surface, disposed to transmit a first light beam perpendicular to the first input surface; a second color-selective dichroic filter having a second input surface, disposed to transmit a second light beam perpendicular to the second input surface; and a third color-selective dichroic filter having a third input surface, disposed to transmit a third light beam perpendicular to the third input surface. The optical element further includes a first reflective polarizer disposed to intercept the first light beam and the second light beam at an angle of approximately 45 degrees; a second reflective polarizer disposed to intercept the third light beam at an angle of approximately 45 degrees;

and a half-wave retarder disposed between the first reflective polarizer and the second reflective polarizer. The optical element still further includes a first, a second, and a third quarter-wave retarder disposed facing each of the first, second and third color-selective dichroic filters, respectively. The first and second reflective polarizers and the retarders are disposed to convert a second polarization state of the first, second and third light beam into a first polarization state of the first, second and third light beams, respectively.

In yet another aspect, an optical element includes a first color-selective dichroic filter having a first input surface, disposed to transmit a first light beam perpendicular to the first input surface; a second color-selective dichroic filter having a second input surface, disposed to transmit a second light beam perpendicular to the second input surface; and a third color-selective dichroic filter having a third input surface, disposed to transmit a third light beam perpendicular to the third input surface. The optical element further includes a first reflective polarizer disposed to intercept the first light beam and the second light beam at an angle of approximately 45 degrees; and a second reflective polarizer disposed to intercept the third light beam at an angle of approximately 45 degrees. The optical element further includes a half-wave retarder disposed facing the third color-selective dichroic filter, opposite the second reflective polarizer; and a first, a second, and a third quarter-wave retarder disposed facing each of the first, second and third color-selective dichroic filters, respectively. In one embodiment, the half-wave retarder is instead adjacent the second reflective polarizer, opposite the third color-selective dichroic filter. The first reflective polarizer and the first and second retarders are disposed to convert a second polarization state of the first and second light beam into a first polarization state of the first and second light beam, respectively, and the second reflective polarizer and the third retarder are disposed to convert a first polarization state of the first, second, and third light beam into a second polarization state of the first, second, and third light beam respectively.

BRIEF DESCRIPTION OF THE DRAWINGS

Throughout the specification reference is made to the appended drawings, where like reference numerals designate like elements, and wherein:

FIGS. 8a-8d are top schematic views of a color combiner.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
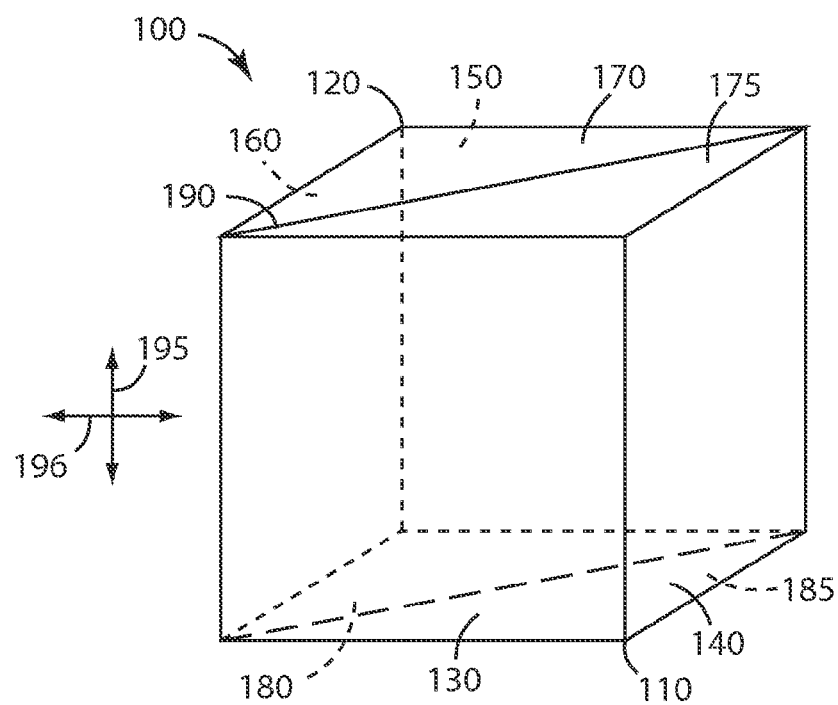
FIG. 1 is a perspective view of a polarizing beam splitter.

The optical elements described herein can be configured as color combiners that receive different wavelength spectrum lights and produce a combined light output that includes the different wavelength spectrum lights. In one aspect, the received light inputs are unpolarized, and the combined light output is polarized in a desired state. In one embodiment, received lights with the undesired polarization state are recycled and rotated to the desired polarization state, improving the light utilization efficiency. The combined light can be a polychromatic combined light that comprises more than one wavelength spectrum of light. The combined light can be a time sequenced output of each of the received lights. In one aspect, each of the different wavelength spectra of light corresponds to a different color light (e.g. red, green and blue), and the combined light output is white light, or a time sequenced red, green and blue light. For purposes of the description provided herein, "color light" and "wavelength spectrum light" are both intended to mean light having a wavelength spectrum range which may be correlated to a specific color if visible to the human eye. The more general term "wavelength spectrum light" refers to both visible and other wavelength spectrums of light including, for example, infrared light.

Also for the purposes of the description provided herein, the term "aligned to a desired polarization state" is intended to associate the alignment of the pass axis of an optical element to a desired polarization state of light that passes through the optical element, i.e., a desired polarization state such as s-polarization, p-polarization, right-circular polarization, left-circular polarization, or the like. In one embodiment described herein with reference to the Figures, an optical element such as a polarizer aligned to the first polarization state means the orientation of the polarizer that passes the p-polarization state of light, and reflects or absorbs the second polarization state (in this case the s-polarization state) of light. It is to be understood that the polarizer can instead be aligned to pass the s-polarization state of light, and reflect or absorb the p-polarization state of light, if desired.

Also for the purposes of the description provided herein, the term "facing" refers to one element disposed so that a perpendicular line from the surface of the element follows an optical path that is also perpendicular to the other element. One element facing another element can include the elements disposed adjacent each other. One element facing another element further includes the elements separated by optics so that a light ray perpendicular to one element is also perpendicular to the other element.

When two or more unpolarized color lights are directed to the optical element, each may be split according to polarization by one or more reflective polarizers. According to one embodiment described below, a color light combining system receives unpolarized light from different color unpolarized light sources, and produces a combined light output that is polarized in one desired state. In one aspect, two, three, four, or more received color lights are each split according to polarization (e.g. s-polarization and p-polarization, or right and left circular polarization) by a reflective polarizer in the optical element. The received light of one polarization state is recycled to become the desired polarization state.

According to one aspect, the optical element comprises a reflective polarizer positioned so that light from each of the three color lights intercept the reflective polarizer at approximately a 45 degree angle. The reflective polarizer can be any known reflective polarizer such as a MacNeille polarizer, a wire grid polarizer, a multilayer optical film polarizer, or a circular polarizer such as a cholesteric liquid crystal polarizer. According to one embodiment, a multilayer optical film polarizer can be a preferred reflective polarizer.

Multilayer optical film polarizers can include different "packets" of layers that serve to interact with different wavelength ranges of light. For example, a unitary multilayer optical film polarizer can include several packets of layers through the film thickness, each packet interacting with a different wavelength range (e.g. color) of light to reflect one polarization state and transmit the other polarization state. In one aspect, a multilayer optical film can have a first packet of layers adjacent a first surface of the film that interacts with, for example, blue colored light (i.e., a "blue layers"), a second packet of layers that interacts with, for example, green colored light (i.e., a "green layers"), and a third packet of layers adjacent a second surface of the film that interacts with, for example, red colored light (i.e. a "red layers"). Typically, the separation between layers in the "blue layers" is much smaller than the separation between layers in the "red layers", in order to interact with the shorter (and higher energy) blue wavelengths of light.

Polymeric multilayer optical film polarizers can be particularly preferred reflective polarizers that can include packets of film layers as described above. Often, the higher energy wavelengths of light, such as blue light, can adversely affect the aging stability of the film, and at least for this reason it is preferable to minimize the number of interactions of blue light with the reflective polarizer. In addition, the nature of the interaction of blue light with the film affects the severity of the adverse aging. Transmission of blue light through the film is generally less detrimental to the film than reflection of blue light entering from the "blue layers" (i.e. thin layers) side. Also, reflection of blue light entering the film from the "blue layers" side is less detrimental to the film than reflection of blue light entering from the "red layers" (i.e., thick layers) side. The present disclosure describes techniques, including placement and orientation of the reflective polarizer, to reduce the number of interactions of blue light with the reflective polarizer, as well as to reduce the severity of the interactions.

The reflective polarizer can be disposed between the diagonal faces of two prisms, or it can be a free-standing film such as a pellicle. In some embodiments, the optical element light utilization efficiency is improved when the reflective polarizer is disposed between two prisms, e.g. a polarizing beam splitter (PBS). In this embodiment, some of the light traveling through the PBS that would otherwise be lost from the optical path can undergo Total Internal Reflection (TIR) from the prism faces and rejoin the optical path. For at least this reason, the following description is directed to optical elements where reflective polarizers are disposed between the diagonal faces of two prisms; however, it is to be understood that the PBS can function in the same manner when used as a pellicle. In one aspect, all of the external faces of the PBS prisms are highly polished so that light entering the PBS undergoes TIR. In this manner, light is contained within the PBS and the light is partially homogenized.

According to one aspect, wavelength selective filters such as color-selective dichroic filters are placed in the path of input light from each of the different colored light sources. Each of the color-selective dichroic filters is positioned so that an input light beam intercepts the filter at near-normal incidence to minimize splitting of s- and p-polarized light, and also to minimize color shifting. Each of the color-selective dichroic filters is selected to transmit light having a wavelength spectrum of the adjacent input light source, and reflect light having a wavelength spectrum of at least one of the other input light sources. In some embodiments, each of the color-selective dichroic filters is selected to transmit light having a wavelength spectrum of the adjacent input light source, and reflect light having a wavelength spectrum of all of the other input light sources. In one aspect, each of the color-selective dichroic filters is positioned relative to the reflective polarizer so that the near-normal input light beam to the surface of each color-selective dichroic filter intersects the reflective polarizer at an intercept angle of approximately 45 degrees. By normal to the surface of a color-selective dichroic filter is meant a line passing perpendicular to the surface the color-selective dichroic filter; by near-normal is meant varying less than about 20 degrees from normal, or preferably less than about 10 degrees from normal. In one embodiment, the intercept angle with the reflective polarizer ranges from about 25 to 65 degrees; from 35 to 55 degrees; from 40 to 50 degrees; from 43 to 47 degrees; or from 44.5 to 45.5 degrees.

In one aspect, input light of an undesired polarization state is converted to the desired polarization state by being directed toward a retarder and a color-selective dichroic filter where it reflects and changes polarization state by passing through the retarder twice. In one embodiment, a retarder is disposed within the light path from each input light to the prism face, so that light from one light source passes through a color-selective dichroic filter and a retarder before entering the PBS prism face. Light having an undesired polarization state is converted by passing through at least a second retarder twice, before and after reflection from at least a second color-selective dichroic filter, changing to the desired polarization state.

In one embodiment, the retarder is placed between the color-selective dichroic filter and the reflective polarizer. The particular combination of color-selective dichroic filters, retarders, and source orientation all cooperate to enable a smaller, more compact, optical element that, when configured as a color combiner, efficiently produces combined light of a single polarization state. According to one aspect, the retarder is a quarter-wave retarder aligned at approximately 45 degrees to a polarization state of the reflective polarizer. In one embodiment, the alignment can be from 35 to 55 degrees; from 40 to 50 degrees; from 43 to 47 degrees; or from 44.5 to 45.5 degrees to a polarization state of the reflective polarizer.

In one aspect, the first color light comprises an unpolarized blue light, the second color light comprises an unpolarized green light and the third color light comprises an unpolarized red light, and the color light combiner combines the red light, blue light and green light to produce polarized white light. In one aspect, the first color light comprises an unpolarized blue light, the second color light comprises an unpolarized green light and the third color light comprises an unpolarized red light, and the color light combiner combines the red, green and blue light to produce a time sequenced polarized red, green and blue light. In one aspect, each of the first, second and third color lights are disposed in separate light sources. In another aspect, more than one of the three color lights is combined into one of the sources. In yet another aspect, more than three color lights are combined in the optical element to produce a combined light.

According to one aspect, the reflective polarizing film comprises a multi-layer optical film. In one embodiment, the PBS produces a first combined light output that includes p-polarized second color light, and s-polarized first and third color light. In another embodiment, the PBS produces a p-polarized first and third color light, and an s-polarized second color light. The first combined light output can be passed through a color-selective stacked retardation filter that selectively changes the polarization of the second color light as the second color light passes through the filter. Such color-selective stacked retardation filters are available from, for example, ColorLink Inc, Boulder, Colo. The filter produces a second combined light output that includes the first, second and third color lights combined to have the same polarization (e.g. s-polarization). The second combined output is useful for illumination of transmissive or reflective display mechanisms that modulate polarized light to produce an image.

The light beam includes light rays that can be collimated, convergent, or divergent when it enters the PBS. Convergent or divergent light entering the PBS can be lost through one of the faces or ends of the PBS. To avoid such losses, all of the exterior faces of a prism based PBS can be polished to enable total internal reflection (TIR) within the PBS. Enabling TIR improves the utilization of light entering the PBS, so that substantially all of the light entering the PBS within a range of angles is redirected to exit the PBS through the desired face.

A polarization component of each color light can pass through to a polarization rotating reflector. The polarization rotating reflector deflects the propagation direction of the light and alters the magnitude of the polarization components, depending of the type and orientation of a retarder disposed in the polarization rotating reflector. The polarization rotating reflector can include a wavelength-selective mirror, such as a color-selective dichroic filter, and a retarder. The retarder can provide any desired retardation, such as an eighth-wave retarder, a quarter-wave retarder, and the like. In embodiments described herein, there is an advantage to using a quarter-wave retarder and an associated dichroic reflector. Linearly polarized light is changed to circularly polarized light as it passes through a quarter-wave retarder aligned at an angle of 45° to the axis of light polarization. Subsequent reflections from the reflective polarizer and quarter-wave retarder/reflectors in the color combiner result in efficient combined light output from the color combiner. In contrast, linearly polarized light is changed to a polarization state partway between s-polarization and p-polarization (either elliptical or linear) as it passes through other retarders and orientations, and can result in a lower efficiency of the combiner. Polarization rotating reflectors generally comprise a color-selective dichroic filter and retarder. The position of the retarder and color-selective dichroic filter relative to the adjacent light source is dependent on the desired path of each of the polarization components, and are described elsewhere with reference to the Figures. In one aspect, the reflective polarizer can be a circular polarizer such as a cholesteric liquid crystal polarizer. According to this aspect, polarization rotating reflectors can comprise color-selective dichroic filters without any associated retarders.

The components of the optical element including prisms, reflective polarizers, quarter-wave retarders, mirrors, filters or other components can be bonded together by a suitable optical adhesive. The optical adhesive used to bond the components together has an index of refraction less than or equal to the index of refraction of the prisms used in the optical element. An optical element that is fully bonded together offers advantages including alignment stability during assembly, handling and use. In some embodiments, two adjacent prisms can be bonded together using an optical adhesive. In some embodiments, a unitary optical component can incorporate the optics of the two adjacent prisms; e.g., such as a single triangular prism which incorporates the optics of two adjacent triangular prisms, as described elsewhere.

The embodiments described above can be more readily understood by reference to the Figures and their accompanying description, which follows.

FIG. 1 is a perspective view of a PBS. PBS 100 includes a reflective polarizer 190 disposed between the diagonal faces of prisms 110 and 120. Prism 110 includes two end faces 175, 185, and a first and second prism face 130, 140 having a 90° angle between them. Prism 120 includes two end faces 170, 180, and a third and fourth prism face 150, 160 having a 90° angle between them. The first prism face 130 is parallel to the third prism face 150, and the second prism face 140 is parallel to the fourth prism face 160. The identification of the four prism faces shown in FIG. 1 with a "first", "second", "third" and "fourth" serves only to clarify the description of PBS 100 in the discussion that follows. First reflective polarizer 190 can be a Cartesian reflective polarizer or a non-Cartesian reflective polarizer. A non-Cartesian reflective polarizer can include multilayer inorganic films such as those produced by sequential deposition of inorganic dielectrics, such as a MacNeille polarizer. A Cartesian reflective polarizer has a polarization axis state, and includes both wire-grid polarizers and polymeric multilayer optical films such as can be produced by extrusion and subsequent stretching of a multilayer polymeric laminate. In one embodiment, reflective polarizer 190 is aligned so that one polarization axis is parallel to a first polarization state 195, and perpendicular to a second polarization state 196. In one embodiment, the first polarization state 195 can be the s-polarization state, and the second polarization state 196 can be the p-polarization state. In another embodiment, the first polarization state 195 can be the p-polarization state, and the second polarization state 196 can be the s-polarization state. As shown in FIG. 1, the first polarization state 195 is perpendicular to each of the end faces 170, 175, 180, 185.

A Cartesian reflective polarizer film provides the polarizing beam splitter with an ability to pass input light rays that are not fully collimated, and that are divergent or skewed from a central light beam axis, with high efficiency. The Cartesian reflective polarizer film can comprise a polymeric multilayer optical film that comprises multiple layers of dielectric or polymeric material. Use of dielectric films can have the advantage of low attenuation of light and high efficiency in passing light. The multilayer optical film can comprise polymeric multilayer optical films such as those described in U.S. Pat. No. 5,962,114 (Jonza et al.) or U.S. Pat. No. 6,721,096 (Bruzzone et al.).

Figure 2:
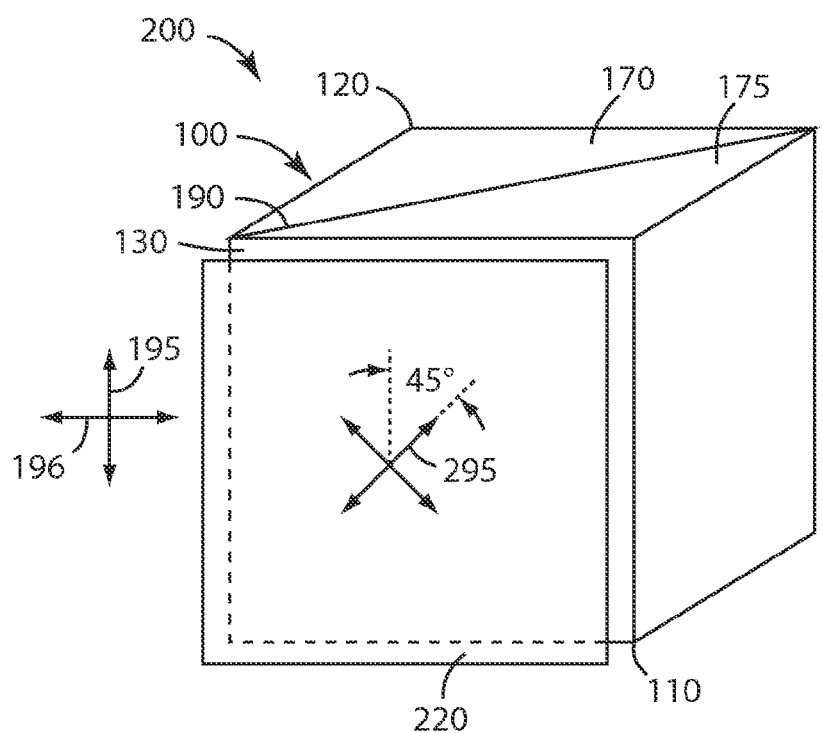
FIG. 2 is a perspective view of a polarizing beam splitter with a quarter-wave retarder.

FIG. 2 is a perspective view of the alignment of a quarter-wave retarder to a PBS, as used in some embodiments. Quarter-wave retarders can be used to change the polarization state of incident light. PBS retarder system 200 includes PBS 100 having first and second prisms 110 and 120. A quarter-wave retarder 220 is disposed adjacent the first prism face 130. Reflective polarizer 190 is, for example, a Cartesian reflective polarizer film aligned to first polarization state 195. Quarter-wave retarder 220 includes a quarter-wave polarization state 295 that can be aligned at 45° to first polarization state 195. Although FIG. 2 shows polarization state 295 aligned at 45° to first polarization state 195 in a clockwise direction, polarization state 295 can instead be aligned at 45° to first polarization state 195 in a counterclockwise direction. In some embodiments, quarter-wave polarization state 295 can be aligned at any degree orientation to first polarization state 195, for example from 90° in a counter-clockwise direction to 90° in a clockwise direction. It can be advantageous to orient the retarder at approximately +/−45° as described, since circularly polarized light results when linearly polarized light passes through a quarter-wave retarder so aligned to the polarization state. Other orientations of quarter-wave retarders can result in s-polarized light not being fully transformed to p-polarized light, and p-polarized light not being fully transformed to s-polarized light upon reflection from the mirrors, resulting in reduced efficiency of the optical elements described elsewhere in this description.

Figure 3:
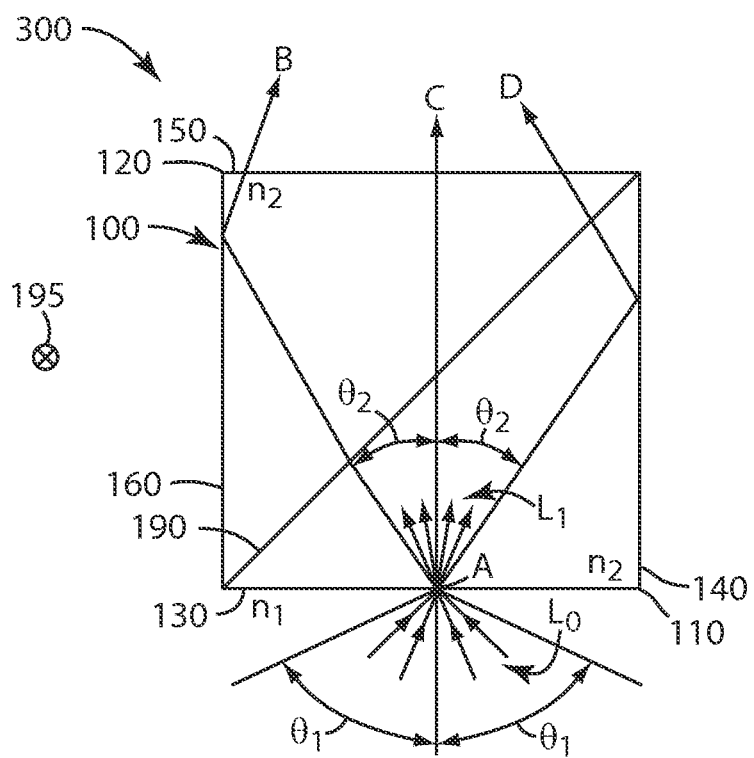
FIG. 3 is a top schematic view of a polarizing beam splitter with polished faces.

FIG. 3 shows a top view of a path of light rays within a polished PBS 300. According to one embodiment, the first, second, third and fourth prism faces 130, 140, 150, 160 of prisms 110 and 120 are polished external surfaces. According to another embodiment, all of the external faces of the PBS 100 (including end faces, not shown) are polished faces that provide TIR of oblique light rays within polished PBS 300. The polished external surfaces are in contact with a material having an index of refraction "$n_1$" that is less than the index of refraction "$n_2$" of prisms 110 and 120. TIR improves light utilization in polished PBS 300, particularly when the light directed into polished PBS 300 is not collimated along a central axis, i.e. the incoming light is either convergent or divergent. At least some light is trapped in polished PBS 300 by total internal reflections until it leaves through third prism face 150. In some cases, substantially all of the light is trapped in polished PBS 300 by total internal reflections until it leaves through third prism face 150.

As shown in FIG. 3, light rays $L_0$ enter first prism face 130 within a range of angles $\theta_1$. Light rays $L_1$ within polished PBS 300 propagate within a range of angles $\theta_2$ such that the TIR condition is satisfied at prism faces 140, 160 and the end faces (not shown). Light rays "AB", "AC" and "AD" represent three of the many paths of light through polished PBS 300, that intersect reflective polarizer 190 at different angles of incidence before exiting through third prism face 150. Light rays "AB" and "AD" also both undergo TIR at prism faces 160 and 140, respectively, before exiting. It is to be understood that ranges of angles $\theta_1$ and $\theta_2$ can be a cone of angles so that reflections can also occur at the end faces of polished PBS 300. In one embodiment, reflective polarizer 190 is selected to efficiently split light of different polarizations over a wide range of angles of incidence. A polymeric multilayer optical film is particularly well suited for splitting light over a wide range of angles of incidence. Other reflective polarizers including MacNeille polarizers and wire-grid polarizers can be used, but are less efficient at splitting the polarized light. A MacNeille polarizer does not efficiently transmit light at angles of incidence that differ substantially from the design angle, which is typically 45 degrees to the polarization selective surface, or normal to the input face of the PBS. Efficient splitting of polarized light using a MacNeille polarizer can be limited to incidence angles below about 6 or 7 degrees from the normal, since significant reflection of the p-polarization state can occur at some larger angles, and significant transmission of s-polarization state can also occur at some larger angles. Both effects can reduce the splitting efficiency of a MacNeille polarizer. Efficient splitting of polarized light using a wire-grid polarizer typically requires an air gap adjacent one side of the wires, and efficiency drops when a wire-grid polarizer is immersed in a higher index medium. A wire-grid polarizer used for splitting polarized light is shown, for example, in PCT publication WO 2008/1002541.

Figure 4A:
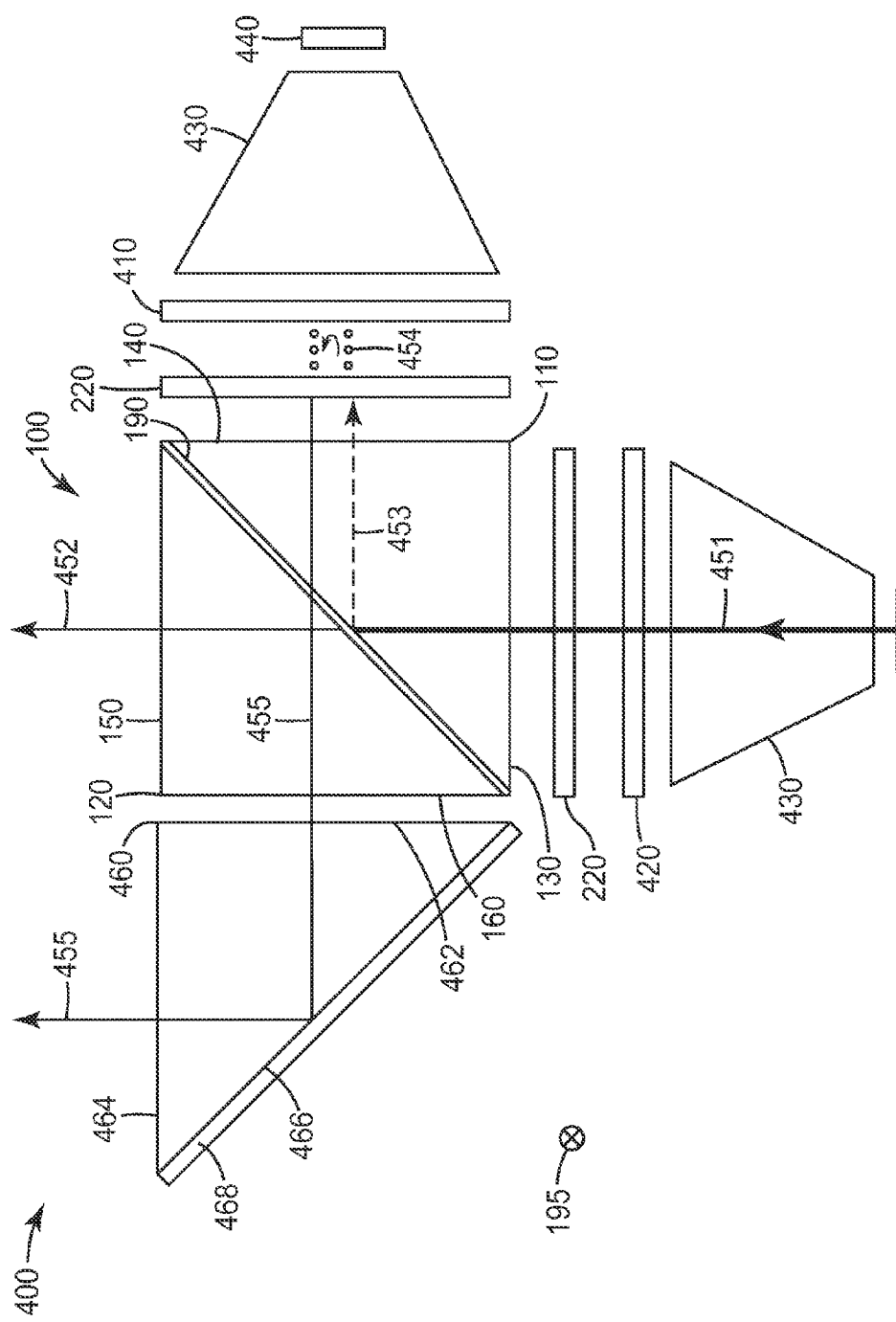
FIGS. 4a-4b are top schematic views of a color combiner.
Figure 4B:
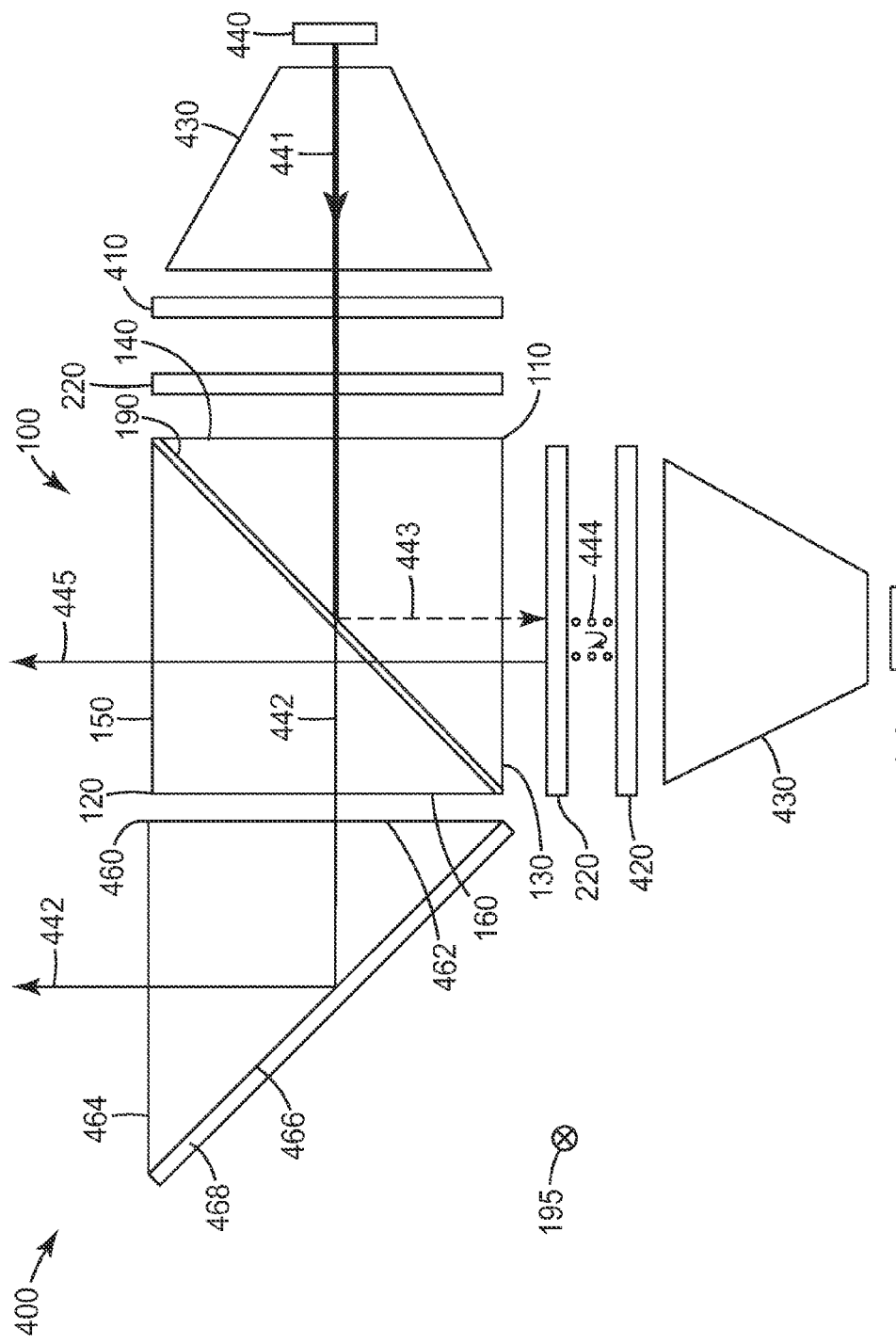

In one aspect, FIGS. 4a-4b are top view schematic representations of an optical element configured as a color combiner 400 that includes a PBS 100 and a reflecting prism 460 adjacent the fourth prism face 160 of PBS 100. Color combiner 400 can be used with a variety of light sources as described elsewhere. The paths of light rays of each polarization state emitted from a first and a second light source 440, 450 are shown in FIGS. 4a-4b, to more clearly illustrate the function of the various components of color combiner 400. PBS 100 includes a reflective polarizer 190 aligned to the first polarization state 195, disposed between the diagonal faces of first and second prisms 110, 120, as described elsewhere. Reflecting prism 460 redirects a portion of the light exiting PBS 100, as described elsewhere. Reflecting prism 460 includes fifth prism face 462, sixth prism face 464 having a 90 degree angle between them, and diagonal prism face 466. Mirror 468 is disposed adjacent diagonal prism face 466. Mirror 468 can also be a pellicle, similar to the pellicle reflective polarizer as described elsewhere, and reflecting prism 460 is not needed. In one embodiment, reflecting prism 460 and second prism 120 can be a unitary optical component (not shown), such as a prism having three sides bounded by mirror 468, reflective polarizer 190 and third and sixth prism faces 150, 464.

A first and second wavelength-selective filter 410, 420 are disposed facing the second and first prism faces 140, 130, respectively. Each of the first and second wavelength-selective filters 410, 420 can be a color-selective dichroic filter selected to transmit a first and second wavelength spectrum of light, respectively, and reflect other wavelength spectrums of light. In one aspect, the reflective polarizer 190 can comprise a polymeric multilayer optical film. In one embodiment, reflective polarizer 190 includes blue layers disposed proximate first and second color-selective dichroic filters 410, 420, as described elsewhere.

A retarder 220 is disposed facing each of the first and second color-selective dichroic filters 410, 420. The retarder 220, color-selective dichroic filter (410, 420), and reflective polarizer 190 cooperate to transmit one polarization state of light through the third and sixth prism faces 150, 464, and recycle the other polarization state of light, as described elsewhere. In one embodiment described below, each retarder 220 in color combiner 400 is a quarter-wave retarder orientated at 45° to the first polarization state 195.

According to another aspect, an optional light tunnel 430 or assemblies of lenses (not shown) can be provided for each of the first and second light sources 440, 450, to provide spacing that separates the light sources from the polarizing beam splitter, as well as provide for some collimation of light. Light tunnels could have straight or curved sides, or they could be replaced by a lens system. Different approaches may be preferred depending on specific details of each application, and those with skill in the art will face no difficulty in selecting the optimal approach for a specific application.

An optional integrator (not shown) can be provided at the output of color combiner 400 to increase uniformity of combined light outputs. According to one aspect, each light source (440, 450) comprises one or more light emitting diodes (LED's). Various light sources can be used such as lasers, laser diodes, organic LED's (OLED's), and non solid state light sources such as ultra high pressure (UHP), halogen or xenon lamps with appropriate collectors or reflectors. Light sources, light tunnels, lenses, and light integrators useful in the present invention are further described, for example, in copending U.S. patent application Ser. No. 60/938,834, the disclosure of which is herein included in its entirety.

The path of a first color light 441 will now be described with reference to FIG. 4b, where unpolarized first color light 441 exits third prism face 150 as p-polarized first color light 445 and sixth prism face 464 as p-polarized first color light 442.

First light source 440 injects unpolarized first color light 441 through first color-selective dichroic filter 410, quarter-wave retarder 220, enters PBS 100 through second prism face 140, intercepts reflective polarizer 190, and is split into p-polarized first color light 442 and s-polarized first color light 443. P-polarized first color light 442 passes through reflective polarizer 190, exits PBS 100 through fourth prism face 160, enters reflecting prism 460 through fifth prism face 462, reflects from mirror 468, and exits reflecting prism 460 through sixth prism face 464 as p-polarized first color light 442.

S-polarized first color light 443 reflects from reflective polarizer 190, exits PBS 100 through first prism face 130, and changes to circularly polarized light 444 as it passes through quarter-wave retarder 220. Circularly polarized light 444 reflects from second color-selective dichroic filter 420, changing state of circular polarization, and changes to p-polarized first color light 445 as it passes through quarter-wave retarder 220. P-polarized first color light 445 enters PBS 100 through first prism face 130, passes unchanged through reflective polarizer 190, and exits PBS 100 through third prism face 150 as p-polarized first color light 445.

The path of a second color light 451 will now be described with reference to FIG. 4a, where unpolarized second color light 451 exits third prism face 150 as p-polarized second color light 452 and sixth prism face 464 as p-polarized second color light 455.

Unpolarized second color light 451 from second light source 450 passes through second color-selective dichroic filter 420, quarter-wave retarder 220, enters PBS 100 through first prism face 130, intercepts reflective polarizer 190, and is split into p-polarized second color light 452 and s-polarized second color light 453. P-polarized second color light 452 passes through reflective polarizer 190, and exits PBS 100 through third prism face 150 as p-polarized second color light 452.

S-polarized second color light 453 reflects from reflective polarizer 190, exits PBS 100 through second prism face 140, and changes to circularly polarized light 454 as it passes through quarter-wave retarder 220. Circularly polarized light 454 reflects from first color-selective dichroic filter 410, changing state of circular polarization, and changes to p-polarized second color light 455 as it passes through quarter-wave retarder 220. P-polarized second color light 455 enters PBS 100 through second prism face 140, passes unchanged through reflective polarizer 190, exits PBS 100 through fourth prism face 160, enters reflecting prism 460 through fifth prism face 462, reflects from mirror 468, and exits reflecting prism 460 through sixth prism face 464 as p-polarized second color light 455.

In one embodiment, first color light 441 is green light and second color light 451 is magenta light. According to this embodiment, first color-selective dichroic filter 410 is a red and blue (i.e., magenta) light reflecting and green light transmitting dichroic filter; second color-selective dichroic filter 420 is a green light reflecting and magenta light transmitting dichroic filter. According to this embodiment, the first polarization state of the blue component of second color light 451 is transmitted twice and the second polarization state of the blue component of second color light 451 is reflected once by the reflective polarizer 190. The single reflection is preferably a front surface reflection from the blue layers, which results from orientation of the reflective polarizer 190, as described elsewhere.

Figure 5A:
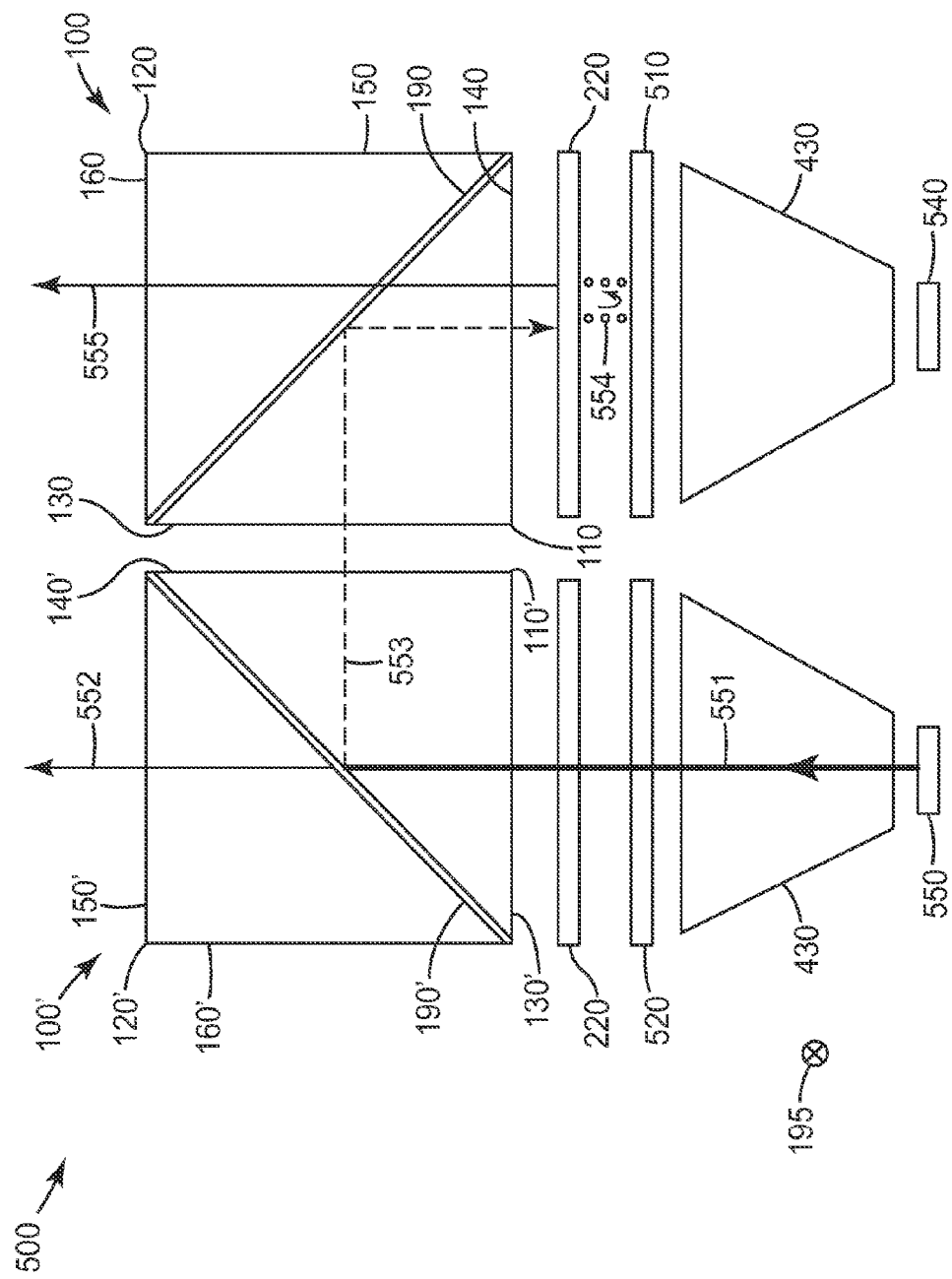
FIGS. 5a-5b are top schematic views of a color combiner.
Figure 5B:
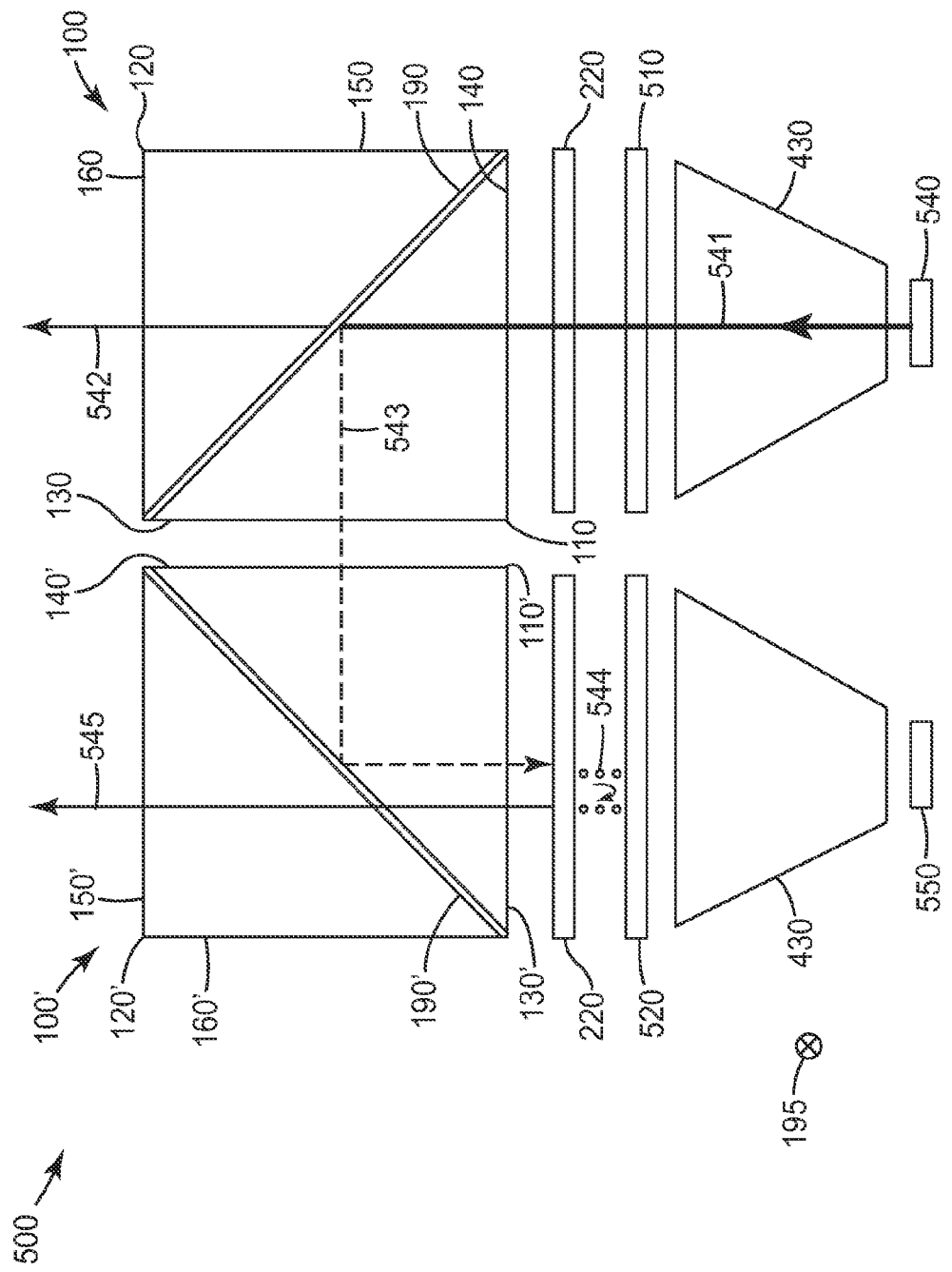

In one aspect, FIGS. 5a-5b are top view schematic representations of an optical element configured as a color combiner 500 that includes a first PBS 100 and a second PBS 100'. Color combiner 500 can be used with a variety of light sources as described elsewhere. The paths of light rays of each polarization emitted from a first and a second light source 540, 550 are shown in FIGS. 5a-5b, to more clearly illustrate the function of the various components of color combiner 500. First PBS 100 and second PBS 100' include a first and second reflective polarizer 190, 190' aligned to the first polarization state 195, disposed between the diagonal faces of first and second prisms 110, 120 and 110', 120', as described elsewhere. In one embodiment, first prism 110' of second PBS 100' and first prism 110 of first PBS 100 can be a unitary optical component (not shown), such as a prism having three sides bounded by second reflective polarizer 190', first reflective polarizer 190, and first prism face 130' and second prism face 140.

A first and second wavelength selective filter 510, 520 is disposed facing the second prism face 140 of first PBS 100 and first prism face 130' of second PBS 100', respectively. Each of the first and second wavelength selective filters 510, 520 can be a color-selective dichroic filter selected to transmit a first and second wavelength spectrum of light, respectively, and reflect other wavelength spectrums of light. In one aspect, the first and second reflective polarizers 190, 190' can comprise a polymeric multilayer optical film. In one embodiment, first reflective polarizer 190 includes blue layers disposed proximate first color-selective dichroic filter 510, and second reflective polarizer 190' includes blue layers disposed proximate second color-selective dichroic filter 520, as described elsewhere.

A retarder 220 is disposed facing each of the first and second wavelength selective filters 510, 520. The retarder 220, wavelength selective filter (510, 520), and first and second reflective polarizer 190, 190' cooperate to transmit one polarization state of light through the fourth prism face 160 of first PBS 100 and third prism face 150' of second PBS 100', and recycle the other polarization state of light, as described elsewhere. In one embodiment described below, each retarder 220 in color combiner 500 is a quarter-wave retarder orientated at 45° to the first polarization state 195.

According to another aspect, an optional light tunnel 430 or assemblies of lenses (not shown) can be provided for each of the first and second light sources 540, 550, as described elsewhere with reference to FIGS. 4a-4b, the disclosure of which applies equally to FIGS. 5a-5b.

The path of a first color light 541 will now be described with reference to FIG. 5b, where unpolarized first color light 541 exits fourth prism face 160 of first PBS 100 as p-polarized first color light 542 and third prism face 150' of second PBS 100' as p-polarized first color light 545.

Unpolarized first color light 541 from first light source 540 passes through first color-selective dichroic filter 510, quarter-wave retarder 220, enters first PBS 100 through second prism face 140, intercepts reflective polarizer 190, and is split into p-polarized first color light 542 and s-polarized first color light 543. P-polarized first color light 542 passes through first reflective polarizer 190, and exits first PBS 100 through fourth prism face 160 as p-polarized first color light 542.

S-polarized first color light 543 reflects from first reflective polarizer 190, exits first PBS 100 through first prism face 130, enters second PBS 100' through second prism face 140', reflects from second reflective polarizer 190', and exits second PBS 100' through first prism face 130'. S-polarized first color light 543 changes to circularly polarized light 544 as it passes through quarter-wave retarder 220, reflects from second color-selective dichroic filter 520, changing state of circular polarization, and changes to p-polarized first color light 545 as it passes through quarter-wave retarder 220. P-polarized first color light 545 enters second PBS 100' through first prism face 130', passes through second reflective polarizer 190', and exits second PBS 100' through third prism face 150' as p-polarized first color light 545.

The path of a second color light 551 will now be described with reference to FIG. 5a, where unpolarized second color light 551 exits fourth prism face 160 of first PBS 100 as p-polarized second color light 555 and third prism face 150' of second PBS 100' as p-polarized second color light 552.

Unpolarized second color light 551 from second light source 550 passes through second color-selective dichroic filter 520, quarter-wave retarder 220, enters second PBS 100' through first prism face 130', intercepts second reflective polarizer 190', and is split into p-polarized second color light 552 and s-polarized second color light 553. P-polarized second color light 552 passes through second reflective polarizer 190', and exits second PBS 100' through third prism face 150' as p-polarized second color light 552.

S-polarized second color light 553 reflects from second reflective polarizer 190', exits second PBS 100' through second prism face 140', enters first PBS 100 through first prism face 130, reflects from first reflective polarizer 190 and exits first PBS 100 through second prism face 140. S-polarized second color light 553 changes to circularly polarized light 554 as it passes through quarter-wave retarder 220, reflects from first color-selective dichroic filter 510 changing state of circular polarization, and changes to p-polarized second color light 555 as it passes through quarter-wave retarder 220. P-polarized second color light 555 enters first PBS 100 through second prism face 140, passes through first reflective polarizer 190, and exits first PBS 100 through fourth prism face 160 as p-polarized second color light 555.

In one embodiment, first color light 541 is green light and second color light 551 is magenta light. According to this embodiment, first color-selective dichroic filter 510 is a red and blue (i.e., magenta) light reflecting and green light transmitting dichroic filter; second color-selective dichroic filter 520 is a green light reflecting and magenta light transmitting dichroic filter. According to this embodiment, the first polarization state of the blue component of second color light 551 is transmitted once and the second polarization state of the blue component of second color light 551 is reflected once by each of the reflective polarizers 190, 190'. The single reflection is preferably a front surface reflection from the blue layers, which results from orientation of the reflective polarizers 190, 190', as described elsewhere.

Figure 6A:
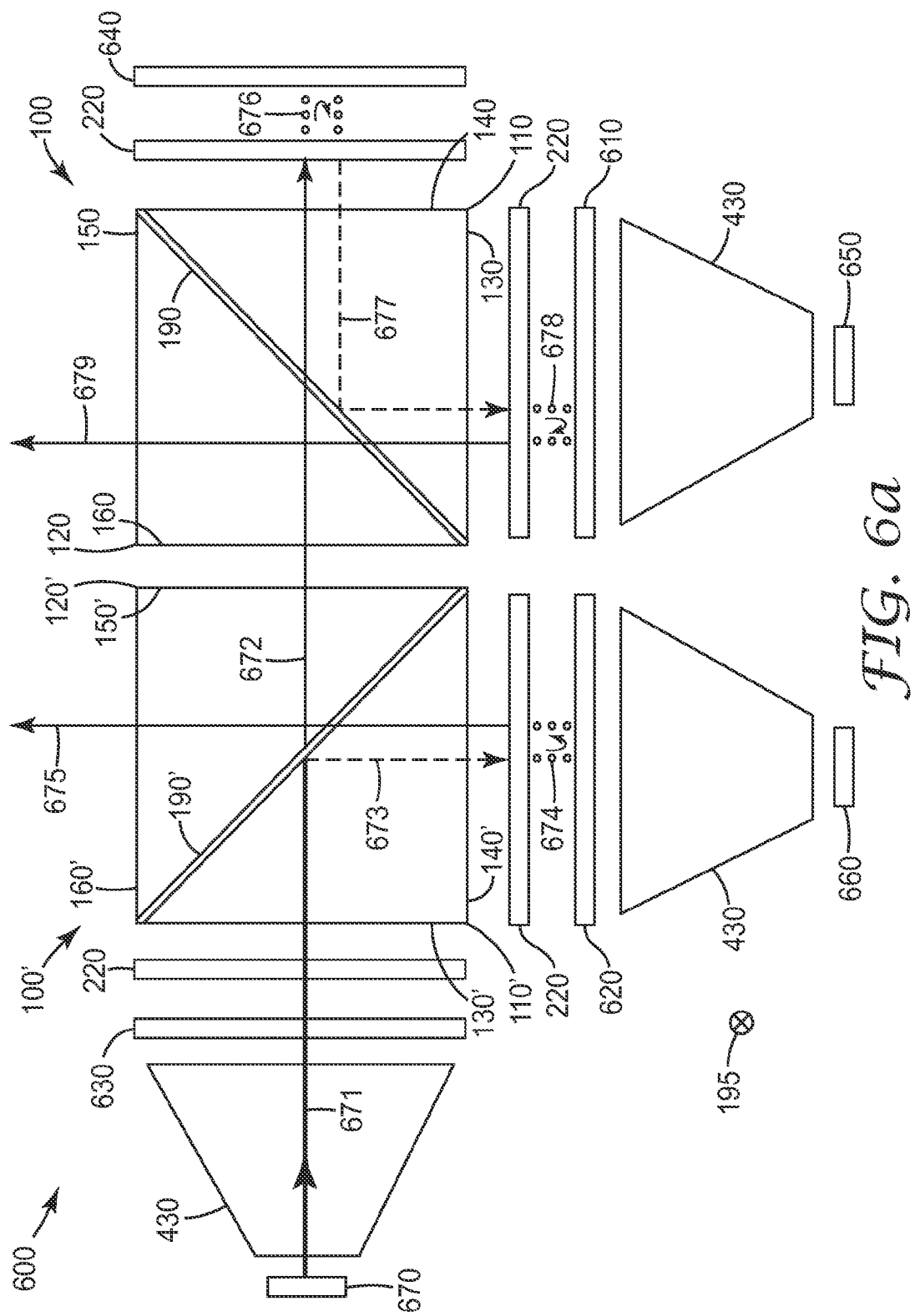
FIGS. 6a-6c are top schematic views of a color combiner.
Figure 6B:
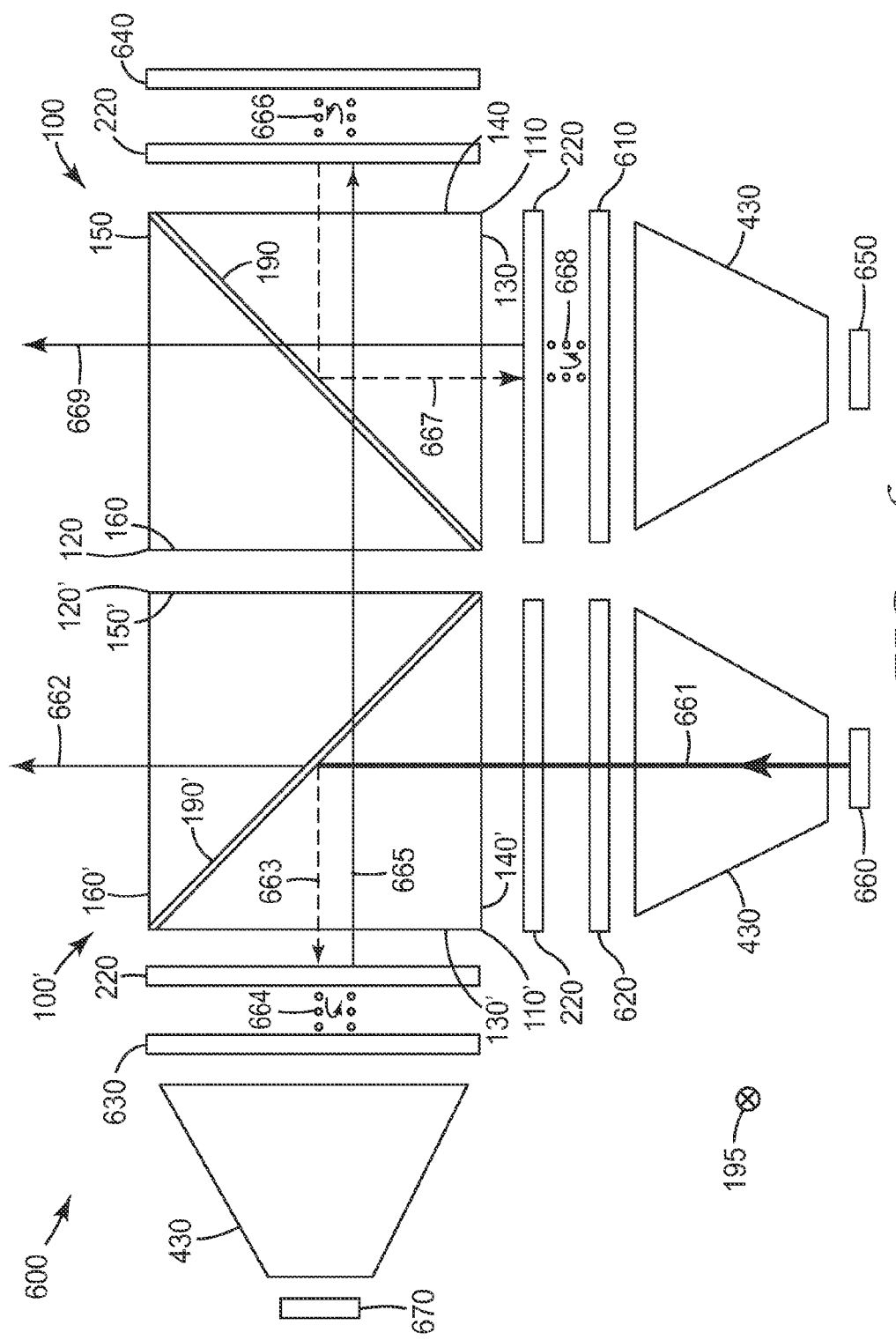
Figure 6C:
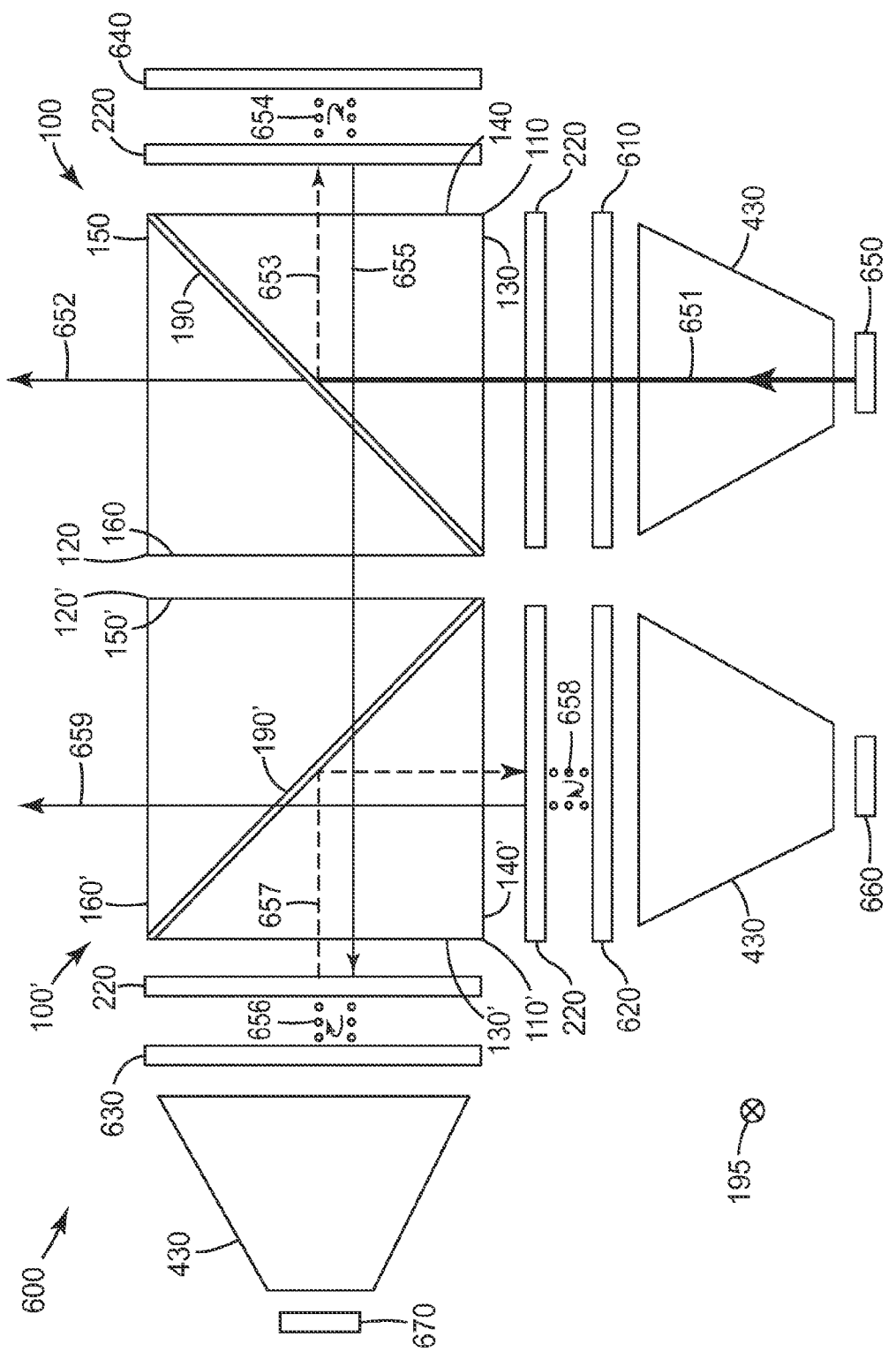

In one aspect, FIGS. 6a-6c are top view schematic representations of an optical element configured as a color combiner 600 that includes a first PBS 100 and a second PBS 100'. Color combiner 600 can be used with a variety of light sources as described elsewhere. The paths of light rays of each polarization emitted from a first, a second and a third light source 650, 660, 670 are shown in FIGS. 6a-6c, to more clearly illustrate the function of the various components of color combiner 600. First PBS 100 and second PBS 100' include a first and second reflective polarizer 190, 190' aligned to the first polarization state 195, disposed between the diagonal faces of first and second prisms 110, 120 and 110', 120', as described elsewhere. In one embodiment, second prism 120' of second PBS 100' and second prism 120 of first PBS 100 can be a unitary optical component (not shown), such as a prism having three sides bounded by second reflective polarizer 190', first reflective polarizer 190, and fourth prism face 160' and third prism face 150.

A first, second and third wavelength selective filter 610, 620, 630 is disposed facing the first prism face 130 of first PBS 100, second prism face 140' of second PBS 100', and first prism face 130' of second PBS 100', respectively. Each of the first, second and third wavelength selective filters 610, 620, 630 can be a color-selective dichroic filter selected to transmit a first, second and third wavelength spectrum of light, respectively, and reflect other wavelength spectrums of light. In one aspect, the first and second reflective polarizers 190, 190' can comprise a polymeric multilayer optical film. In one embodiment, first reflective polarizer 190 includes blue layers disposed proximate first color-selective dichroic filter 610, and second reflective polarizer 190' includes blue layers disposed proximate both second color-selective dichroic filter 620 and third color-selective dichroic filter 630, as described elsewhere.

A polarization rotating reflector comprising a broadband mirror 640 is disposed facing the second prism face 140 of first PBS 100. The polarization rotating reflector further comprises a retarder 220 disposed between second prism face 140 and broadband mirror 640. Broadband mirror 640 and retarder 220 serve to convert polarization states of light leaving first PBS 100 through second prism face 140, and redirect the converted polarization state light back into first PBS 100, as described elsewhere.

A retarder 220 is disposed facing each of the first, second and third color-selective filters 610, 620, 630. The retarder 220, color-selective filter (610, 620, 630), and first and second reflective polarizer 190, 190' cooperate to transmit one polarization state of light through the third prism face 150 of first PBS 100 and the fourth prism face 160' of second PBS 100', and recycle the other polarization state of light, as described elsewhere. In one embodiment described below, each retarder 220 in color combiner 600 is a quarter-wave retarder orientated at 45° to the first polarization state 195.

According to another aspect, an optional light tunnel 430 or assemblies of lenses (not shown) can be provided for each of the first, second and third light sources 650, 660, 670, as described elsewhere with reference to FIGS. 4a-4b, the disclosure of which applies equally to FIGS. 6a-6c.

The path of a first color light 651 will now be described with reference to FIG. 6c, where unpolarized first color light 651 exits third prism face 150 of first PBS 100 as p-polarized first color light 652 and fourth prism face 160' of second PBS 100' as p-polarized first color light 659.

Unpolarized first color light 651 from first light source 650 passes through first color-selective dichroic filter 610, quarter-wave retarder 220, enters first PBS 100 through first prism face 130, intercepts first reflective polarizer 190, and is split into p-polarized first color light 652 and s-polarized first color light 653. P-polarized first color light 652 passes through first reflective polarizer 190, and exits first PBS 100 through third prism face 150 as p-polarized first color light 652.

S-polarized first color light 653 reflects from first reflective polarizer 190, exits first PBS 100 through second prism face 140, changes to circularly polarized light 654 as it passes through quarter-wave retarder 220, reflects from broadband mirror 640 changing state of circular polarization, and changes to p-polarized first color light 655 as it passes through quarter-wave retarder 220. P-polarized first color light 655 enters first PBS 100 through second prism face 140, passes through first reflective polarizer 190, exits first PBS 100 through fourth prism face 160, enters second PBS 100' through third prism face 150', passes through second reflective polarizer 190', and exits second PBS 100' through first prism face 130'. P-polarized first color light 655 changes to circularly polarized light 656 as it passes through quarter-wave retarder 220, reflects from third color-selective dichroic filter 630 changing state of circular polarization, changes to s-polarized first color light 657 as it passes through quarter-wave retarder 220, enters second PBS 100' through first prism face 130', reflects from second reflective polarizer 190', and exits second PBS 100' through second prism face 140'. S-polarized first color light 657 changes to circularly polarized light 658 as it passes through quarter-wave retarder 220, reflects from second color-selective dichroic filter 620 changing state of circular polarization, becomes p-polarized first color light 659 as it passes through quarter-wave retarder 220, enters second PBS 100' through second prism face 140', passes through second reflective polarizer 190', and exits second PBS 100' through fourth prism face 160' as p-polarized first color light 659.

The path of a second color light 661 will now be described with reference to FIG. 6b, where unpolarized second color light 661 exits third prism face 150 of first PBS 100 as p-polarized second color light 669 and fourth prism face 160' of second PBS 100' as p-polarized second color light 662.

Unpolarized second color light 661 from second light source 660 passes through second color-selective dichroic filter 620, quarter-wave retarder 220, enters second PBS 100' through second prism face 140', intercepts second reflective polarizer 190', and is split into p-polarized second color light 662 and s-polarized second color light 663. P-polarized second color light 662 passes through second reflective polarizer 190', and exits second PBS 100' through fourth prism face 160' as p-polarized second color light 662.

S-polarized second color light 663 reflects from second reflective polarizer 190', exits second PBS 100' through first prism face 130', changes to circularly polarized light 664 as it passes through quarter-wave retarder 220, reflects from third color-selective dichroic filter 630 changing state of circular polarization, changes to p-polarized second color light 665 as it passes through quarter-wave retarder 220, enters second PBS 100' through first prism face 130', passes through second reflective polarizer 190', and exits second PBS 100' through third prism face 150'. P-polarized second color light 665 enters first PBS 100 through fourth prism face 160, passes through first reflective polarizer 190, exits first PBS 100 through second prism face 140, and changes to circularly polarized light 666 as it passes through quarter-wave retarder 220. Circularly polarized light 666 reflects from broadband mirror 640 changing state of circular polarization, changes to s-polarized second color light 667 as it passes through quarter-wave retarder 220, enters first PBS 100 through second prism face 140, reflects from first reflective polarizer 190, and exits first PBS 100 through first prism face 130. S-polarized second color light 667 changes to circularly polarized light 668 as it passes through quarter-wave retarder 220, reflects from first color-selective dichroic filter 610 changing state of circular polarization, changes to p-polarized second color light 669 as it passes through quarter-wave retarder 220 and enters first PBS 100 through first prism face 130. P-polarized second color light 669 passes through first reflective polarizer 190, and exits first PBS 100 through third prism face 150 as p-polarized second color light 669.

The path of a third color light 671 will now be described with reference to FIG. 6a, where unpolarized third color light 671 exits third prism face 150 of first PBS 100 as p-polarized third color light 679 and fourth prism face 160' of second PBS 100' as p-polarized third color light 675.

Unpolarized third color light 671 from third light source 670 passes through third color-selective dichroic filter 630, quarter-wave retarder 220, enters second PBS 100' through first prism face 130', intercepts second reflective polarizer 190', and is split into p-polarized third color light 672 and s-polarized third color light 673. P-polarized third color light 672 passes through second reflective polarizer 190', exits second PBS 100' through third prism face 150', enters first PBS 100 through fourth prism face 160, passes through first reflective polarizer 190, and exits first PBS 100 through second prism face 140. P-polarized third color light 672 changes to circularly polarized light 676 as it passes through quarter-wave retarder 220, reflects from broadband mirror 640 changing the state of circular polarization, becomes s-polarized third color light 677 as it passes through quarter-wave retarder 220, and enters first PBS 100 through second prism face 140. S-polarized third color light 677 reflects from first reflective polarizer 190, exits first PBS 100 through first prism face 130, changes to circularly polarized light 678 as it passes through quarter-wave retarder 220, reflects from first color-selective dichroic filter 610 changing state of circular polarization, and passes through quarter-wave retarder 220 changing to p-polarized third color light 679. P-polarized third color light 679 enters first PBS 100 through first prism face 130, passes though first reflective polarizer 190, and exits first PBS 100 through third prism face 150 as p-polarized third color light 679.

S-polarized third color light 673 reflects from second reflective polarizer 190', exits second PBS 100' through second prism face 140', changes to circularly polarized light 674 as it passes through quarter-wave retarder 220, reflects from second color-selective dichroic filter 620 changing state of circular polarization, and changes to p-polarized third color light 675 as it passes through quarter-wave retarder 220. P-polarized third color light 675 enters second PBS 100' through second prism face 140', passes through second reflective polarizer 190', and exits second PBS 100' through fourth prism face 160' as p-polarized third color light 675.

In one embodiment, first color light 651 is green light, second color light 661 is blue light, and third color light 671 is red light. According to this embodiment, first color-selective dichroic filter 610 is a red and blue light reflecting and green light transmitting dichroic filter; second color-selective dichroic filter 620 is a green and red light reflecting and blue light transmitting dichroic filter; third color-selective dichroic filter 630 is a blue and green light reflecting and red light transmitting dichroic filter. According to this embodiment, the first polarization state of the blue second color light 661 is transmitted twice through each of the reflective polarizers 190, 190', and the second polarization state of the blue second color light 661 is reflected once by each of the reflective polarizers 190, 190'. The single reflection is preferably a front surface reflection from the blue layers, which results from orientation of the reflective polarizers 190, 190', as described elsewhere.

In one embodiment, a fourth color light (not shown) can also be injected into the color combiner 600. In this embodiment, the polarization rotating reflector comprises a fourth color-selective dichroic filter that replaces the broadband mirror 640 described above, an optional light tunnel, and a fourth light source arranged in a manner similar to the first, second and third 650, 660, 670 light sources, optional light tunnels 430, and color-selective dichroic filters 610, 620, 630 shown in FIGS. 6a-6c. Fourth color-selective dichroic filter reflects first, second and third color lights 651, 661, 671, and transmits fourth color light (not shown). In this embodiment, fourth color light also passes through third prism face 150 of first PBS 100 and fourth prism face 160' of second PBS 100' in the p-polarization state.

Figure 7A:
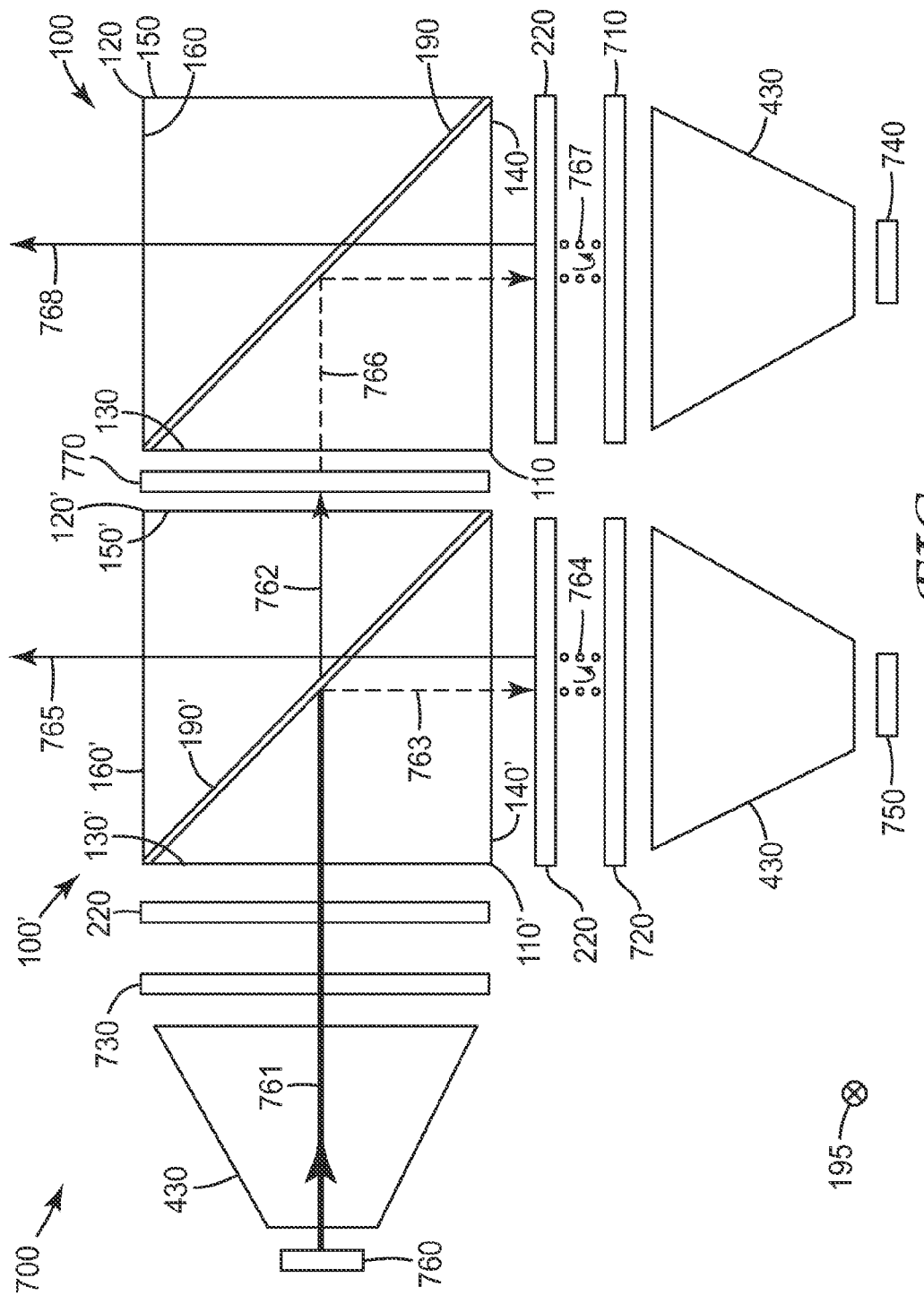
FIGS. 7a-7d are top schematic views of a color combiner.
Figure 7B:
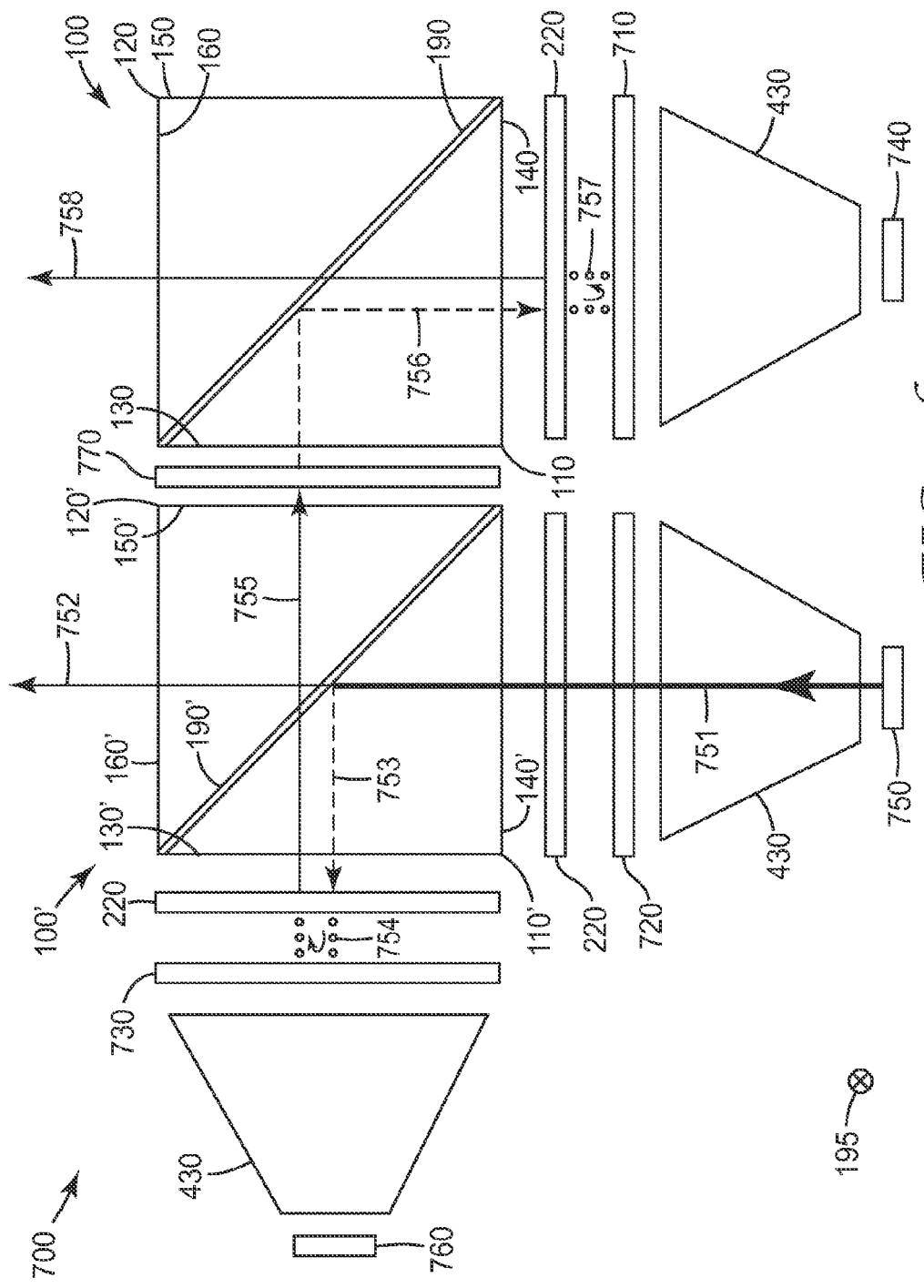
Figure 7C:
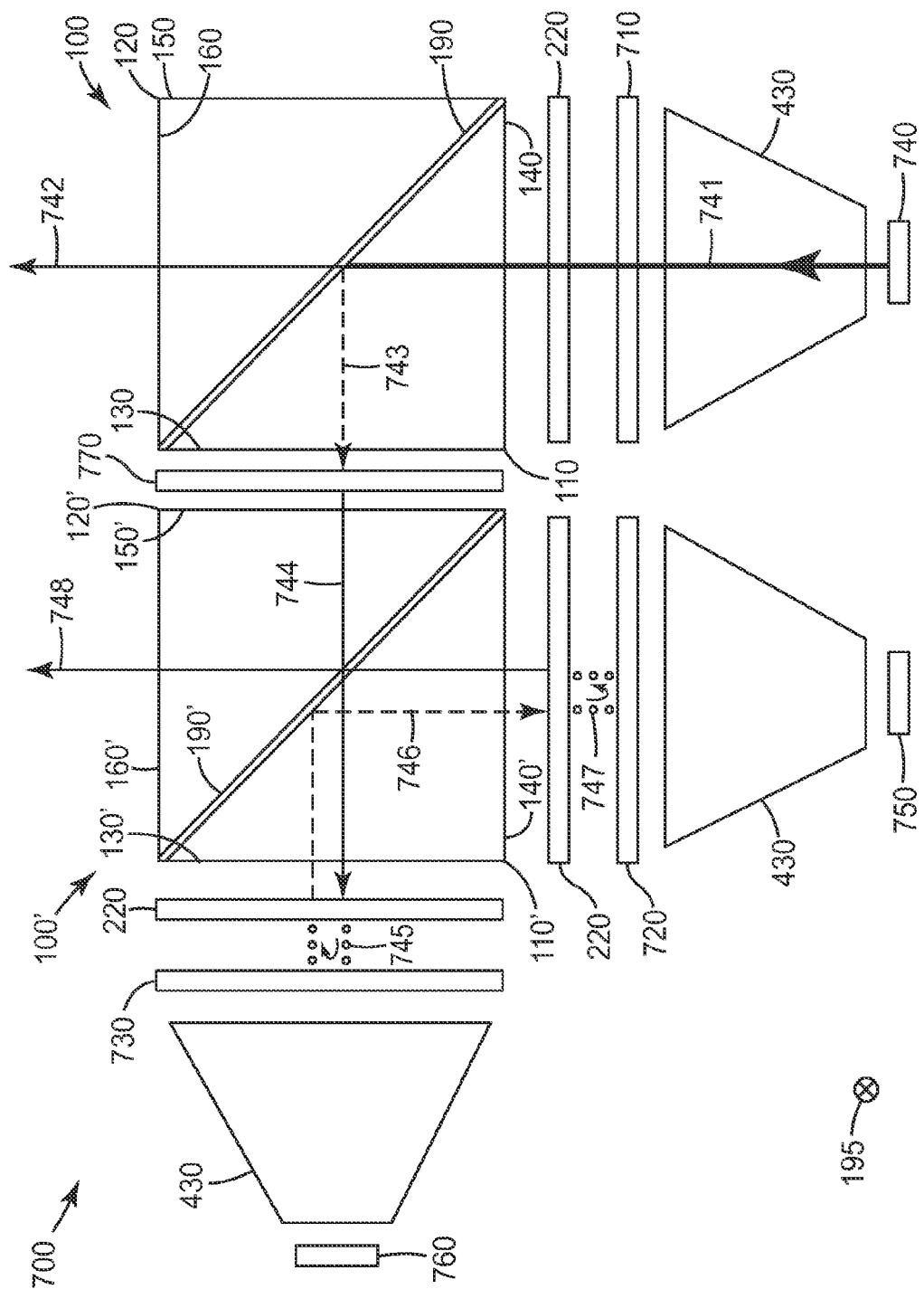
Figure 7D:
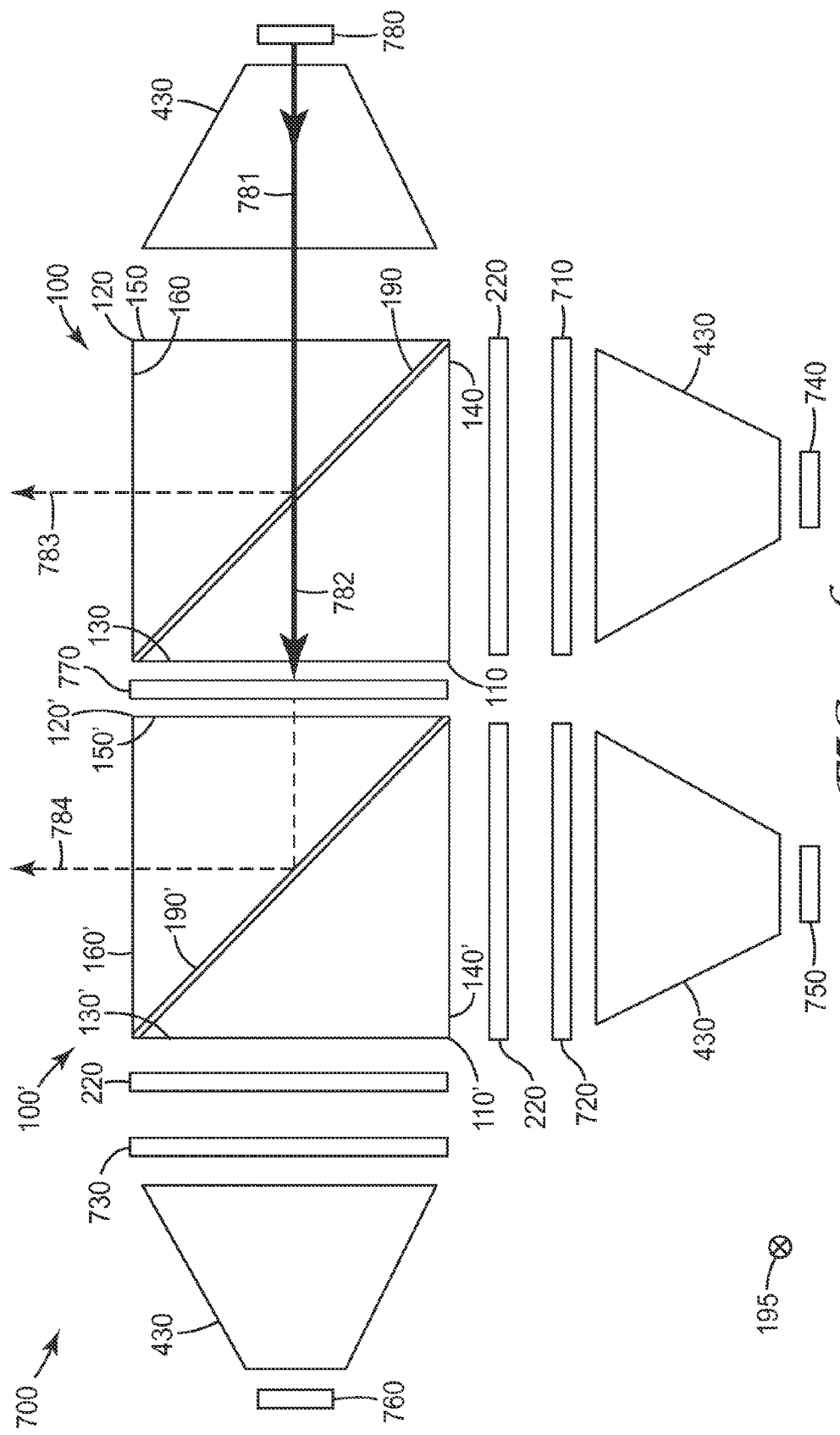

In one aspect, FIGS. 7a-7d are top view schematic representations of an optical element configured as a color combiner 700 that includes a first PBS 100 and a second PBS 100'. Color combiner 700 can be used with a variety of light sources as described elsewhere. The paths of light rays of each polarization emitted from a first, a second and a third light source 740, 750, 760 are shown in FIGS. 7a-7c, to more clearly illustrate the function of the various components of color combiner 700. The path of an optional fourth light source 780 is shown in FIG. 7d. First PBS 100 and second PBS 100' include a first and second reflective polarizer 190, 190' aligned to the first polarization state 195, disposed between the diagonal faces of first and second prisms 110, 120 and 110', 120', as described elsewhere.

A first, second and third wavelength selective filter 710, 720, 730 is disposed facing the second prism face 140 of first PBS 100, second prism face 140' of second PBS 100', and first prism face 130' of second PBS 100', respectively. Each of the first, second and third wavelength selective filters 710, 720, 730 can be a color-selective dichroic filter selected to transmit a first, second and third wavelength spectrum of light, respectively, and reflect other wavelength spectrums of light. In one aspect, the first and second reflective polarizers 190, 190' can comprise a polymeric multilayer optical film. In one embodiment, first reflective polarizer 190 includes blue layers disposed proximate first color-selective dichroic filter 710, and second reflective polarizer 190' includes blue layers disposed proximate second color-selective dichroic filter 720 and third color-selective dichroic filter 730, as described elsewhere.

A retarder 220 is disposed facing each of the first, second and third color-selective filters 710, 720, 730. The retarder 220, color-selective filter (710, 720, 730), and first and second reflective polarizer 190, 190' cooperate to transmit one polarization state of light through the fourth prism face 160 of first PBS 100 and fourth prism face 160' of second PBS 100', and recycle the other polarization state of light, as described elsewhere. In one embodiment described below, each retarder 220 in color combiner 700 is a quarter-wave retarder orientated at 45° to the first polarization state 195.

Color combiner 700 further includes a half-wave retarder 770 disposed between first prism face 130 of first PBS 100, and third prism face 150' of second PBS 100'. Half-wave retarder 770 cooperates with first and second polarizer 190, 190' to convert the polarization state of light passing through it, and is also orientated at 45° to the first polarization state 195.

According to another aspect, an optional light tunnel 430 or assemblies of lenses (not shown) can be provided for each of the first, second and third light sources 740, 750, 760, as described elsewhere with reference to FIGS. 4a-4b, the disclosure of which applies equally to FIGS. 7a-7d.

The path of a first color light 741 will now be described with reference to FIG. 7c, where unpolarized first color light 741 exits fourth prism face 160 of first PBS 100 as p-polarized first color light 742 and fourth prism face 160' of second PBS 100' as p-polarized first color light 748.

Unpolarized first color light 741 from first light source 740 passes through first color-selective dichroic filter 710, quarter-wave retarder 220, enters first PBS 100 through second prism face 140, intercepts reflective polarizer 190, and is split into p-polarized first color light 742 and s-polarized first color light 743. P-polarized first color light 742 passes through first reflective polarizer 190, and exits first PBS 100 through fourth prism face 160 as p-polarized first color light 742.

S-polarized first color light 743 reflects from first reflective polarizer 190, exits first PBS 100 through first prism face 130, changes to p-polarized first color light 744 as it passes through half-wave retarder 770, enters second PBS 100' through third prism face 150', passes through second reflective polarizer 190', and exits second PBS 100' through first prism face 130'. P-polarized first color light 744 changes to circularly polarized light 745 as it passes through quarter-wave retarder 220, reflects from third color-selective dichroic filter 730 changing state of circular polarization, and changes to s-polarized first color light 746 as it passes through quarter-wave retarder 220. S-polarized first color light 746 enters second PBS 100' through first prism face 130', reflects from second reflective polarizer 190', exits second PBS 100' through second prism face 140', and changes to circularly polarized light 747 as it passes through quarter-wave retarder 220. Circularly polarized light 747 reflects from second color-selective dichroic filter 720 changing state of circular polarization, changes to p-polarized first color light 748 as it passes through quarter-wave retarder 220, enters second PBS 100' through second prism face 140', passes through second reflective polarizer 190', and exits second PBS 100' through fourth prism face 160' as p-polarized first color light 748.

The path of a second color light 751 will now be described with reference to FIG. 7b, where unpolarized second color light 751 exits fourth prism face 160 of first PBS 100 as p-polarized second color light 758 and fourth prism face 160' of second PBS 100' as p-polarized second color light 752.

Unpolarized second color light 751 from second light source 750 passes through second color-selective dichroic filter 720, quarter-wave retarder 220, enters second PBS 100' through second prism face 140', intercepts second reflective polarizer 190', and is split into p-polarized second color light 752 and s-polarized second color light 753. P-polarized second color light 752 passes through second reflective polarizer 190', and exits second PBS 100' through fourth prism face 160' as p-polarized second color light 752.

S-polarized second color light 753 reflects from second reflective polarizer 190', exits second PBS 100' through first prism face 130', changes to circularly polarized light 754 as it passes through quarter-wave retarder 220, reflects from third color-selective dichroic filter 730 changing state of circular polarization, changes to p-polarized second color light 755 as it passes through quarter-wave retarder 220, enters second PBS 100' through first prism face 130', passes through second reflective polarizer 190', and exits second PBS 100' through third prism face 150'. P-polarized second color light 755 changes to s-polarized second color light 756 as it passes through half-wave retarder 770, enters first PBS 100 through first prism face 130, reflects from first reflective polarizer 190, exits first PBS 100 through second prism face 140, and changes to circularly polarized light 757 as it passes through quarter-wave retarder 220. Circularly polarized light 757 reflects from first color-selective dichroic filter 710 changing state of circular polarization, changes to p-polarized second color light 758 as it passes through quarter-wave retarder 220, enters first PBS 100 through second prism face 140, passes through first reflective polarizer 190, and exits first PBS 100 through fourth prism face 160 as p-polarized second color light 758.

The path of a third color light 761 will now be described with reference to FIG. 7a, where unpolarized third color light 761 exits fourth prism face 160 of first PBS 100 as p-polarized third color light 768 and fourth prism face 160' of second PBS 100' as p-polarized third color light 765.

Unpolarized third color light 761 from third light source 760 passes through third color-selective dichroic filter 730, quarter-wave retarder 220, enters second PBS 100' through first prism face 130', intercepts second reflective polarizer 190', and is split into p-polarized third color light 762 and s-polarized third color light 763. P-polarized third color light 762 passes through second reflective polarizer 190', exits second PBS 100' through third prism face 150', and changes to s-polarized third color light 766 as it passes through half-wave retarder 770. S-polarized third color light 766 reflects from first reflective polarizer 190, exits first PBS 100 through second prism face 140, changes to circularly polarized light 767 as it passes through quarter-wave retarder 220, reflects from first color-selective dichroic filter 710 changing the state of circular polarization, and becomes p-polarized third color light 768 as it passes through quarter-wave retarder 220. P-polarized third color light 768 enters first PBS 100 through second prism face 140, passes through first reflective polarizer 190, and exits first PBS 100 through fourth prism face 160 as p-polarized third color light 768.

S-polarized third color light 763 reflects from second reflective polarizer 190', exits second PBS 100' through second prism face 140', changes to circularly polarized light 764 as it passes through quarter-wave retarder 220, reflects from second color-selective dichroic filter 720 changing state of circular polarization, and changes to p-polarized third color light 765 as it passes through quarter-wave retarder 220. P-polarized third color light 765 enters second PBS 100' through second prism face 140', passes through second reflective polarizer 190', and exits second PBS 100' through fourth prism face 160' as p-polarized third color light 765.

In one embodiment, first color light 741 is green light, second color light 751 is blue light, and third color light 761 is red light. According to this embodiment, first color-selective dichroic filter 710 is a red and blue light reflecting and green light transmitting dichroic filter; second color-selective dichroic filter 720 is a green and red light reflecting and blue light transmitting dichroic filter; third color-selective dichroic filter 730 is a blue and green light reflecting and red light transmitting dichroic filter. According to this embodiment, the first polarization state of the blue second color light 751 is transmitted twice through the second reflective polarizer 190' and once through the first reflective polarizer 190; the second polarization state of the blue second color light 751 is reflected once by each of the second reflective polarizer 190' and the first reflective polarizer 190. The single reflection from each reflective polarizer is preferably a front surface reflection from the blue layers, which results from orientation of the reflective polarizers 190, 190', as described elsewhere.

In one embodiment, a fourth color light can also be injected into the color combiner 700, as shown in FIG. 7d. In this embodiment, adjacent to third prism face 150 of first PBS 100 can be placed an optional light tunnel 430 and a fourth light source 780 arranged in a manner similar to the first, second and third light sources 740, 750, 760 and optional light tunnels 430 as shown in FIGS. 7a-7c. In this embodiment, an additional quarter-wave retarder 220 and an additional color-selective dichroic filter are not needed, since none of the light rays from the first, second or third light sources 740, 750, 760, pass through third prism face 150. In this embodiment, s-polarized fourth color light passes through fourth prism face 160 of first PBS 100 and fourth prism face 160' of second PBS 100'. S-polarized fourth color light can be rotated to p-polarized fourth color light by a color-selective stacked retardation filter, as described elsewhere.

Fourth color light 781 from fourth color light source 780 passes through optional light tunnel 430, enters first PBS 100 through third prism face 150, and intercepts first reflective polarizer 190 where it is split into p-polarized fourth color light 782 and s-polarized fourth color light 783. S-polarized fourth color light 783 reflects from first reflective polarizer 190 and leaves first PBS 100 through fourth prism face 160 as s-polarized fourth color light 783.

P-polarized fourth color light 782 passes through first reflective polarizer 190, exits first PBS 100 through first prism face 130, changes to s-polarized fourth color light 784 as it passes through half-wave retarder 770, enters second PBS 100 through third prism face 150', reflects from second reflective polarizer 190' and exits second PBS 100' through fourth prism face 160' as s-polarized fourth color light 784.

Figure 8A:
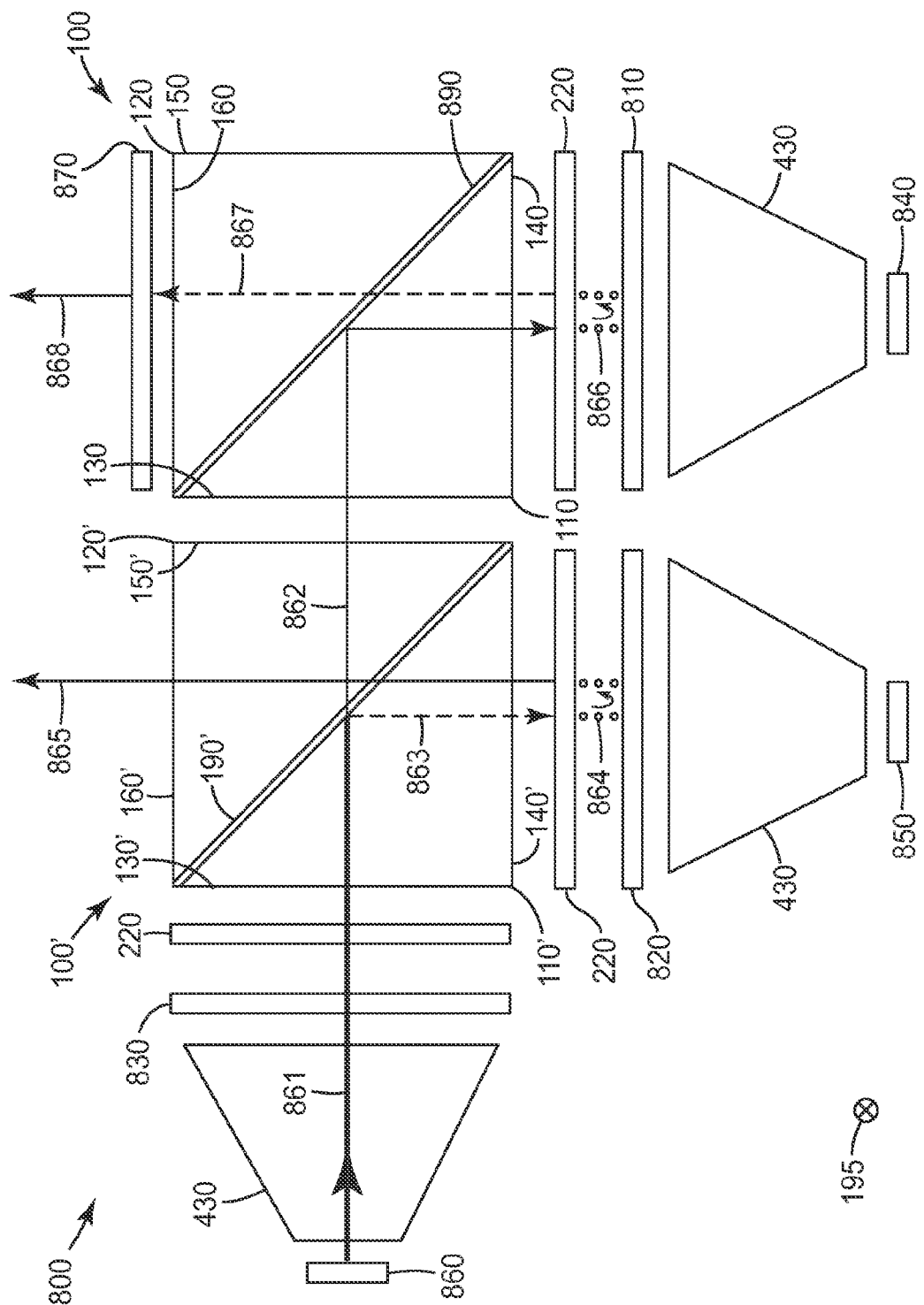

In one aspect, FIG. 8a is a top view schematic representation of an optical element configured as a color combiner 800 that includes a first PBS 100 and a second PBS 100'. Color combiner 800 can be used with a variety of light sources as described elsewhere. The path of light rays of each polarization emitted from a third light source 860 is shown in FIG. 8a, to more clearly illustrate the function of the various components of color combiner 800. The paths of light rays of each polarization emitted from a first and second light source 840, 850 are not shown in FIG. 8a; however, these light paths are readily determined from the description provided for third light source 860, and the descriptions provided for color combiner embodiments in FIGS. 6a-6c and 7a-7d.

First PBS 100 and second PBS 100' include a first and second reflective polarizer 890, 190'. First reflective polarizer 890 is aligned at 90 degrees to the first polarization state 195, and is disposed between the diagonal faces of first and second prisms 110, 120, as described elsewhere. Second reflective polarizer 190' is aligned to the first polarization state 195, and is disposed between the diagonal faces of first and second prisms and 110', 120', as described elsewhere. In one embodiment, second prism 120' of second PBS 100' and first prism 110 of first PBS 100 can be a unitary optical component (not shown), such as a parallelogram having four sides bounded by second reflective polarizer 190', first reflective polarizer 890, fourth prism face 160', and second prism face 140.

A first, second and third wavelength selective filter 810, 820, 830 is disposed facing the second prism face 140 of first PBS 100, second prism face 140' of second PBS 100', and first prism face 130' of second PBS 100', respectively. Each of the first, second and third wavelength selective filters 810, 820, 830 can be a color-selective dichroic filter selected to transmit a first, second and third wavelength spectrum of light, respectively, and reflect other wavelength spectrums of light. In one aspect, the first and second reflective polarizers 890, 190' can comprise a polymeric multilayer optical film. In one embodiment, first reflective polarizer 890 includes blue layers disposed proximate first color-selective dichroic filter 810, and second reflective polarizer 190' includes blue layers disposed proximate second color-selective dichroic filter 820 and third color-selective dichroic filter 830, as described elsewhere.

A retarder 220 is disposed facing each of the first, second and third color-selective filters 810, 820, 830. The retarder 220, color-selective filter (810, 820, 830), and first and second reflective polarizer 890, 190' cooperate to transmit one polarization state of light through the fourth prism face 160 of first PBS 100, transmit the other polarization state of light through the fourth prism face 160' of second PBS 100', and recycle other polarization states of light, as described elsewhere. In one embodiment described below, each retarder 220 in color combiner 800 is a quarter-wave retarder orientated at 45° to the first polarization state 195.

Color combiner 800 further includes a half-wave retarder 870 disposed facing fourth prism face 160 of first PBS 100. Half-wave retarder 870 cooperates with first and second polarizer 890, 190' to convert the polarization state of light passing through it, and is also orientated at 45° to the first polarization state 195. In one embodiment (not shown), half-wave retarder can instead be disposed adjacent to first reflective polarizer 890 on the diagonal face of second prism 120. The resulting light output from each of the light sources 840, 850, 860, remains the same as described with reference to the configuration shown in FIG. 8a and FIG. 8c.

According to another aspect, an optional light tunnel 430 or assemblies of lenses (not shown) can be provided for each of the first, second and third light sources 840, 850, 860, as described elsewhere with reference to FIGS. 4a-4b, the disclosure of which applies equally to FIG. 8a.

The path of a third color light 861 will now be described with reference to FIG. 8a, where unpolarized third color light 861 exits half-wave retarder 870 as p-polarized third color light 868 and fourth prism face 160' of second PBS 100' as p-polarized third color light 865.

Unpolarized third color light 861 from third light source 860 passes through third color-selective dichroic filter 830, quarter-wave retarder 220, enters second PBS 100' through first prism face 130', intercepts second reflective polarizer 190', and is split into p-polarized third color light 862 and s-polarized third color light 863. P-polarized third color light 862 passes through second reflective polarizer 190', exits second PBS 100' through third prism face 150', enters first PBS 100 through first prism face 130, reflects from first reflective polarizer 890, and exits first PBS 100 through second prism face 140. P-polarized third color light 862 changes to circularly polarized light 866 as it passes through quarter-wave retarder 220, reflects from first color-selective dichroic filter 810 changing the state of circular polarization, and changes to s-polarized third color light 867 as it passes through quarter-wave retarder 220. S-polarized third color light 867 enters first PBS 100 through second prism face 140, passes through first reflective polarizer 890, exits first PBS 100 through fourth prism face 160, and changes to p-polarized third color light 868 as it passes through half-wave retarder 870.

S-polarized third color light 863 reflects from second reflective polarizer 190', exits second PBS 100' through second prism face 140', changes to circularly polarized light 864 as it passes through quarter-wave retarder 220, reflects from second color-selective dichroic filter 820 changing state of circular polarization, and changes to p-polarized third color light 865 as it passes through quarter-wave retarder 220. P-polarized third color light 865 enters second PBS 100' through second prism face 140', passes through second reflective polarizer 190', and exits second PBS 100' through fourth prism face 160' as p-polarized third color light 865.

In one embodiment, first light source 840 emits green light, second light source 850 emits blue light, and third color light 861 is red light. According to this embodiment, first color-selective dichroic filter 810 is a red and blue light reflecting and green light transmitting dichroic filter; second color-selective dichroic filter 820 is a green and red light reflecting and blue light transmitting dichroic filter; third color-selective dichroic filter 830 is a blue and green light reflecting and red light transmitting dichroic filter. According to this embodiment, the p-polarization state of the blue color light from second light source 850 is transmitted twice through the second reflective polarizer 190' and reflected once from the first reflective polarizer 890; the s-polarization state of the blue color light from second light source 850 is reflected once by the second reflective polarizer 190' and transmitted once through the first reflective polarizer 890. The reflections are preferably a front surface reflection from the blue layers, which results from orientation of the reflective polarizers 890, 190', as described elsewhere.

Figure 8C:
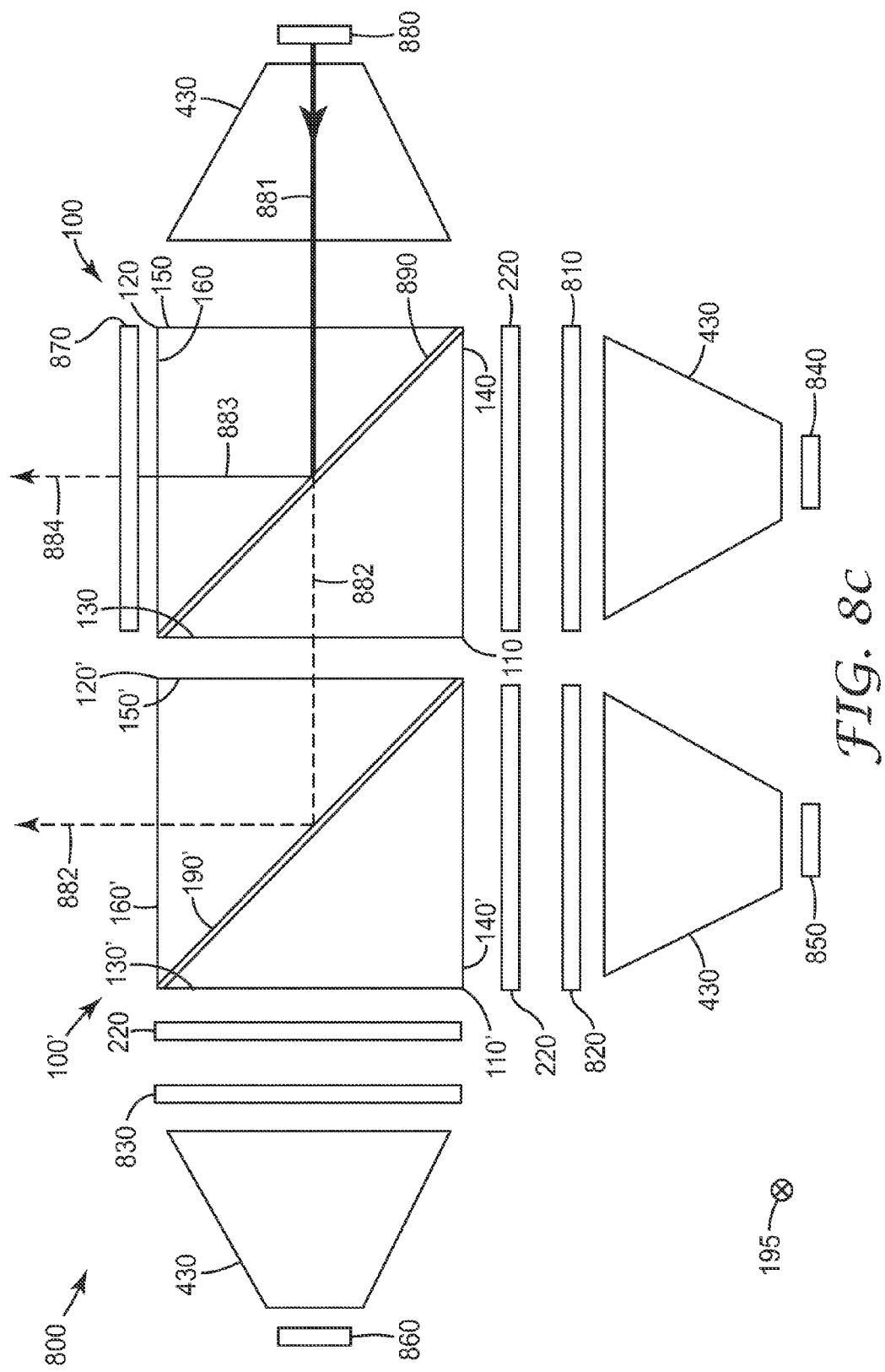

In one embodiment, a fourth color light can also be injected into the color combiner 800, as shown in FIG. 8c. In this embodiment, adjacent to third prism face 150 of first PBS 100 can be placed an optional light tunnel 430 and a fourth light source 880 arranged in a manner similar to the first, second and third light sources 840, 850, 860 and optional light tunnels 430 as shown in FIG. 8a. In this embodiment, an additional quarter-wave retarder 220 and an additional color-selective dichroic filter are not needed, since none of the light rays from the first, second or third light sources 840, 850, 860, pass through third prism face 150. In this embodiment, s-polarized fourth color light passes through fourth prism face 160 of first PBS 100 and fourth prism face 160' of second PBS 100'. S-polarized fourth color light can be rotated to p-polarized fourth color light by a color-selective stacked retardation filter, as described elsewhere.

Fourth color light 881 from fourth color light source 880 passes through optional light tunnel 430, enters first PBS 100 through third prism face 150, and intercepts first reflective polarizer 890 where it is split into p-polarized fourth color light 883 and s-polarized fourth color light 882. P-polarized fourth color light 883 reflects from first reflective polarizer 890, leaves first PBS 100 through fourth prism face 160, and changes to s-polarized fourth color light 884 as it passes through half-wave retarder 870.

S-polarized fourth color light 882 passes through first reflective polarizer 890, exits first PBS 100 through first prism face 130, reflects from second reflective polarizer 190' and exits second PBS 100' through fourth prism face 160' as s-polarized fourth color light 882.

In one aspect, FIG. 8b is a top view schematic representation of an optical element configured as a color combiner 801 that includes a first PBS 100 and a second PBS 100'. Color combiner 801 can be used with a variety of light sources as described elsewhere. The path of light rays of each polarization emitted from a third light source 860 is shown in FIG. 8b, to more clearly illustrate the function of the various components of color combiner 801. The paths of light rays of each polarization emitted from a first and second light source 840, 850 are not shown in FIG. 8b; however, these light paths are readily determined from the description provided for third light source 860, and the descriptions provided for color combiner embodiments in FIGS. 6a-6c and 7a-7d.

First PBS 100 and second PBS 100' include a first and second reflective polarizer 190, 190' aligned to the first polarization state 195, disposed between the diagonal faces of first and second prisms 110, 120 and 110', 120', as described elsewhere. In one embodiment, second prism 120' of second PBS 100' and first prism 110 of first PBS 100 can be a unitary optical component (not shown), such as a parallelogram having four sides bounded by second reflective polarizer 190', half-wave retarder 870, fourth prism face 160', and second prism face 140.

A first, second and third wavelength selective filter 810, 820, 830 is disposed facing the second prism face 140 of first PBS 100, second prism face 140' of second PBS 100', and first prism face 130' of second PBS 100', respectively. Each of the first, second and third wavelength selective filters 810, 820, 830 can be a color-selective dichroic filter selected to transmit a first, second and third wavelength spectrum of light, respectively, and reflect other wavelength spectrums of light. In one aspect, the first and second reflective polarizers 190, 190' can comprise a polymeric multilayer optical film. In one embodiment, first reflective polarizer 190 includes blue layers disposed proximate first color-selective dichroic filter 810, and second reflective polarizer 190' includes blue layers disposed proximate second color-selective dichroic filter 820 and third color-selective dichroic filter 830, as described elsewhere.

A retarder 220 is disposed facing each of the first, second and third color-selective filters 810, 820, 830. The retarder 220, color-selective filter (810, 820, 830), and first and second reflective polarizer 190, 190' cooperate to transmit one polarization state of light through fourth prism face 160 of first PBS 100 and fourth prism face 160' of second PBS 100', and recycle the other polarization state of light, as described elsewhere. In one embodiment described below, each retarder 220 in color combiner 801 is a quarter-wave retarder orientated at 45° to the first polarization state 195.

Color combiner 801 further includes a half-wave retarder 870 disposed between first reflective polarizer 190, 190', adjacent first reflective polarizer 190 and diagonal face of first prism 110. Half-wave retarder 870 cooperates with first and second polarizer 190, 190' to convert the polarization state of light passing through it, and is also orientated at 45° to the first polarization state 195. In one embodiment (not shown), half-wave retarder is instead disposed between first prism face 130 of first PBS 100 and third prism face 150' of second PBS 100'. The resulting light output from each of the light sources 840, 850, 860, remains the same as described with reference to the configuration shown in FIG. 8b and FIG. 8d.

According to another aspect, an optional light tunnel 430 or assemblies of lenses (not shown) can be provided for each of the first, second and third light sources 840, 850, 860, as described elsewhere with reference to FIGS. 4a-4b, the disclosure of which applies equally to FIG. 8b.

The path of a third color light 861 will now be described with reference to FIG. 8b, where unpolarized third color light 861 exits fourth prism face 160 of first PBS 100 as p-polarized third color light 869 and fourth prism face 160' of second PBS 100' as p-polarized third color light 865.

Unpolarized third color light 861 from third light source 860 passes through third color-selective dichroic filter 830, quarter-wave retarder 220, enters second PBS 100' through first prism face 130', intercepts second reflective polarizer 190', and is split into p-polarized third color light 862 and s-polarized third color light 863. P-polarized third color light 862 passes through second reflective polarizer 190', exits second PBS 100' through third prism face 150', enters first PBS 100 through first prism face 130, passes through half-wave retarder 870 changing to s-polarized third color light (not shown), reflects from first reflective polarizer 190, passes again through half-wave retarder 870 becoming p-polarized third color light 866, and exits first PBS 100 through second prism face 140. P-polarized third color light 866 changes to circularly polarized light 867 as it passes through quarter-wave retarder 220, reflects from first color-selective dichroic filter 810 changing the state of circular polarization, and changes to s-polarized third color light 868 as it passes through quarter-wave retarder 220. S-polarized third color light 868 enters first PBS 100 through second prism face 140, passes through half-wave retarder 870 changing to p-polarized third color light 869, passes through first reflective polarizer 190, and exits first PBS 100 through fourth prism face 160 as p-polarized third color light 869.

S-polarized third color light 863 reflects from second reflective polarizer 190', exits second PBS 100' through second prism face 140', changes to circularly polarized light 864 as it passes through quarter-wave retarder 220, reflects from second color-selective dichroic filter 820 changing state of circular polarization, and changes to p-polarized third color light 865 as it passes through quarter-wave retarder 220. P-polarized third color light 865 enters second PBS 100' through second prism face 140', passes through second reflective polarizer 190', and exits second PBS 100' through fourth prism face 160' as p-polarized third color light 865.

In one embodiment, first light source 840 emits green light, second light source 850 emits blue light, and third color light 861 is red light. According to this embodiment, first color-selective dichroic filter 810 is a red and blue light reflecting and green light transmitting dichroic filter; second color-selective dichroic filter 820 is a green and red light reflecting and blue light transmitting dichroic filter; third color-selective dichroic filter 830 is a blue and green light reflecting and red light transmitting dichroic filter. According to this embodiment, the p-polarization state of the blue color light from second light source 850 is transmitted twice through the second reflective polarizer 190' and transmitted once through the first reflective polarizer 190; the s-polarization state of the blue color light from second light source 850 is reflected once by the second reflective polarizer 190' and reflected once by the first reflective polarizer 190. The single reflections are preferably front surface reflections from the blue layers, which results from orientation of the reflective polarizers 190, 190', as described elsewhere.

Figure 8D:
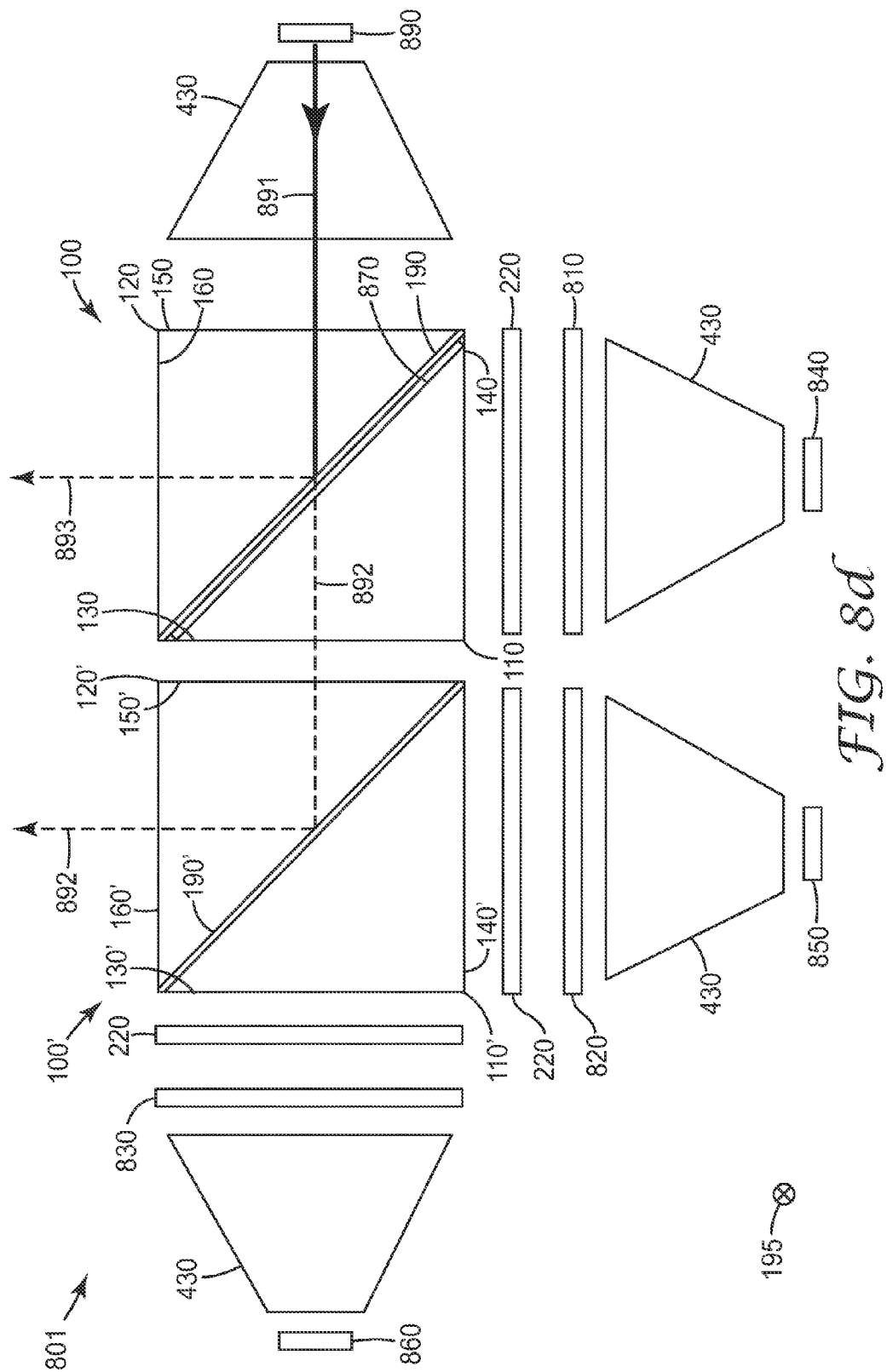

In one embodiment, a fourth color light can also be injected into the color combiner 801, as shown in FIG. 8d. In this embodiment, adjacent to third prism face 150 of first PBS 100 can be placed an optional light tunnel 430 and a fourth light source 890 arranged in a manner similar to the first, second and third light sources 840, 850, 860 and optional light tunnels 430 as shown in FIG. 8b. In this embodiment, an additional quarter-wave retarder 220 and an additional color-selective dichroic filter are not needed, since none of the light rays from the first, second or third light sources 840, 850, 860, pass through third prism face 150. In this embodiment, s-polarized fourth color light passes through fourth prism face 160 of first PBS 100 and fourth prism face 160' of second PBS 100'. S-polarized fourth color light can be rotated to p-polarized fourth color light by a color-selective stacked retardation filter, as described elsewhere.

Fourth color light 891 from fourth color light source 890 passes through optional light tunnel 430, enters first PBS 100 through third prism face 150, and intercepts first reflective polarizer 190. S-polarized fourth color light 893 reflects from first reflective polarizer 190 and exits first PBS 100 through fourth prism face 160. P-polarized fourth color light passes through first reflective polarizer 190 and changes to s-polarized fourth color light 892 as it passes through half-wave retarder 870. S-polarized fourth color light 892 exits first PBS 100 through first prism face 130, enters second PBS 100' through third prism face 150', reflects from second reflective polarizer 190', and exits second PBS 100' through fourth prism face 160' as S-polarized fourth color light 892.

Figure 9A:
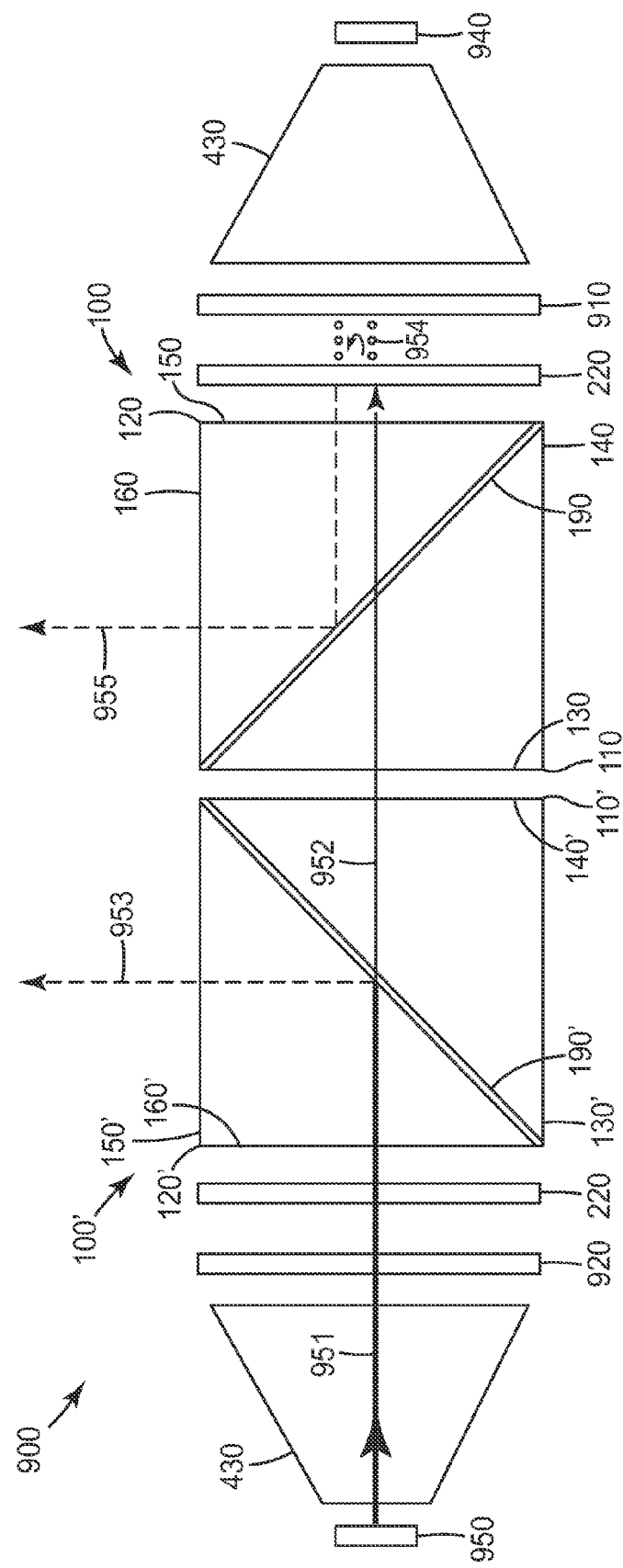
FIGS. 9a-9c are top schematic views of a color combiner.
Figure 9B:
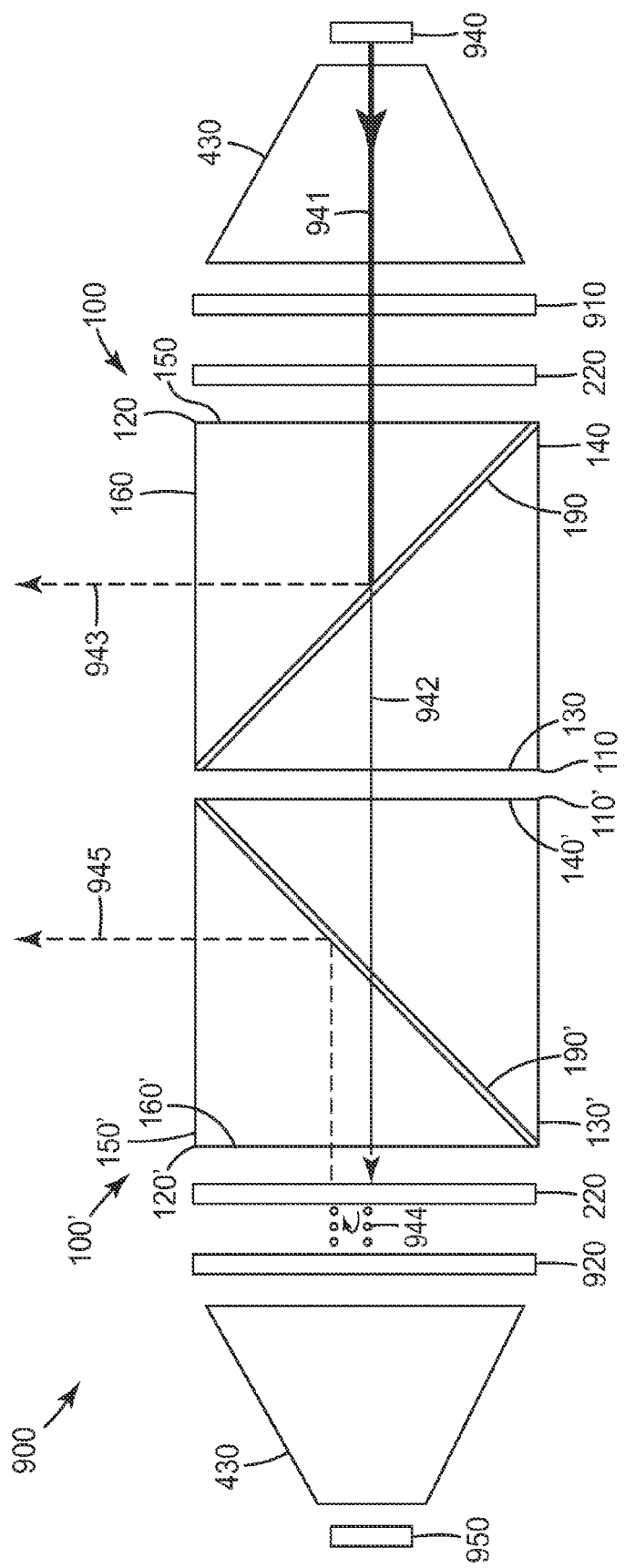
Figure 9C:
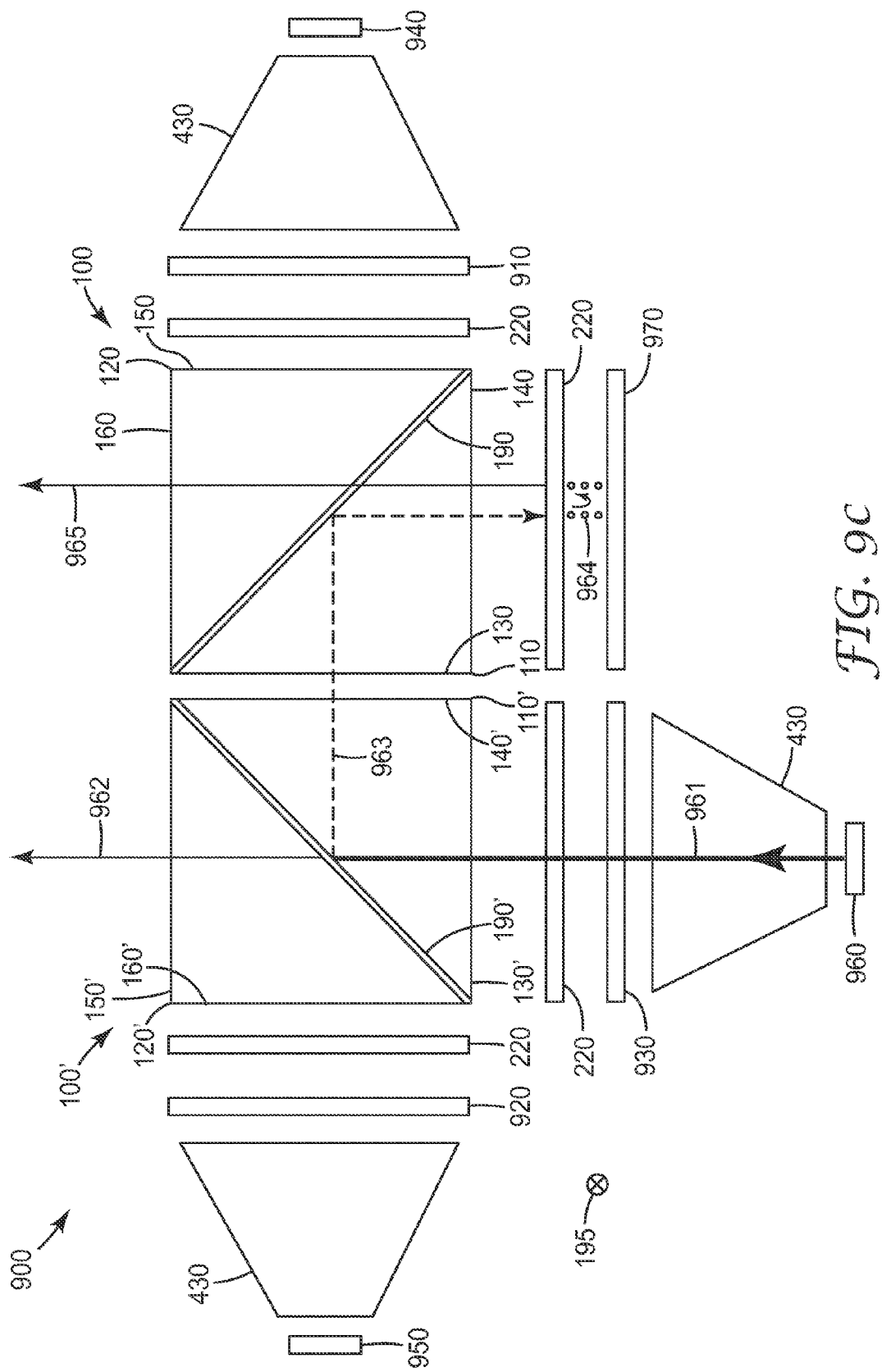

In one aspect, FIGS. 9a-9c are top view schematic representations of an optical element configured as a color combiner 900 that includes a first PBS 100 and a second PBS 100'. Color combiner 900 can be used with a variety of light sources as described elsewhere. The paths of light rays of each polarization emitted from a first and a second light source 940, 950 are shown in FIGS. 9a-9b, to more clearly illustrate the function of the various components of color combiner 900. The path of an optional third light source 960 is shown in FIG. 9c. First PBS 100 and second PBS 100' include a first and second reflective polarizer 190, 190' aligned to the first polarization state 195, disposed between the diagonal faces of first and second prisms 110, 120 and 110', 120', as described elsewhere. In one embodiment, first prism 110' of second PBS 100' and first prism 110 of first PBS 100 can be a unitary optical component (not shown), such as a prism having three sides bounded by second reflective polarizer 190', first reflective polarizer 190, and first prism face 130' and second prism face 140.

A first and second wavelength selective filter 910, 920 is disposed facing the third prism face 150 of first PBS 100 and fourth prism face 160' of second PBS 100', respectively. Each of the first and second wavelength selective filters 910, 920 can be a color-selective dichroic filter selected to transmit a first and second wavelength spectrum of light, respectively, and reflect other wavelength spectrums of light. In one aspect, the first and second reflective polarizers 190, 190' can comprise a polymeric multilayer optical film. In one embodiment, first reflective polarizer 190 includes blue layers disposed proximate first color-selective dichroic filter 910, and second reflective polarizer 190' includes blue layers disposed proximate second color-selective dichroic filter 920, as described elsewhere.

A retarder 220 is disposed facing each of the first and second color-selective dichroic filters 910, 920. The retarder 220, color-selective dichroic filter (910, 920), and first and second reflective polarizer 190, 190' cooperate to transmit one polarization state of light through the fourth prism face 160 of first PBS 100 and third prism face 150' of second PBS 100', and recycle the other polarization state of light, as described elsewhere. In one embodiment described below, each retarder 220 in color combiner 900 is a quarter-wave retarder orientated at 45° to the first polarization state 195.

According to another aspect, an optional light tunnel 430 or assemblies of lenses (not shown) can be provided for each of the first and second light sources 940, 950, as described elsewhere with reference to FIGS. 4a-4b, the disclosure of which applies equally to FIGS. 9a-9c.

The path of a first color light 941 will now be described with reference to FIG. 9b, where unpolarized first color light 941 exits fourth prism face 160 of first PBS 100 as s-polarized first color light 943 and third prism face 150' of second PBS 100' as s-polarized first color light 945.

Unpolarized first color light 941 from first light source 940 passes through first color-selective dichroic filter 910, quarter-wave retarder 220, enters first PBS 100 through third prism face 150, intercepts first reflective polarizer 190, and is split into p-polarized first color light 942 and s-polarized first color light 943. S-polarized first color light 943 reflects from first reflective polarizer 190, and exits first PBS 100 through fourth prism face 160 as s-polarized first color light 943.

P-polarized first color light 942 passes through first reflective polarizer 190, exits first PBS 100 through first prism face 130, enters second PBS 100' through second prism face 140', passes through second reflective polarizer 190', and exits second PBS 100' through fourth prism face 160'. P-polarized first color light 942 changes to circularly polarized light 944 as it passes through quarter-wave retarder 220, reflects from second color-selective dichroic filter 920 changing the state of circular polarization, and changes to s-polarized first color light 945 as it passes through quarter-wave retarder 220. S-polarized first color light 945 enters second PBS 100' through fourth prism face 160', reflects from second reflective polarizer 190', and exits second PBS 100' through third prism face 150' as s-polarized first color light 945.

The path of a second color light 951 will now be described with reference to FIG. 9a, where unpolarized second color light 951 exits fourth prism face 160 of first PBS 100 as s-polarized second color light 955 and third prism face 150' of second PBS 100' as s-polarized second color light 953.

Unpolarized second color light 951 from second light source 950 passes through second color-selective dichroic filter 920, quarter-wave retarder 220, enters second PBS 100' through fourth prism face 160', intercepts second reflective polarizer 190', and is split into p-polarized second color light 952 and s-polarized second color light 953. S-polarized second color light 953 reflects from second reflective polarizer 190', and exits second PBS 100' through third prism face 150' as s-polarized second color light 953.

P-polarized second color light 952 passes through second reflective polarizer 190', exits second PBS 100' through second prism face 140', enters first PBS 100 through first prism face 130, passes through first reflective polarizer 190, and exits first PBS 100 through third prism face 150. P-polarized second color light 952 changes to circularly polarized light 954 as it passes through quarter-wave retarder 220, reflects from first color-selective dichroic filter 910 changing the state of circular polarization, and changes to s-polarized second color light 955 as it passes through quarter-wave retarder 220. S-polarized second color light 955 enters first PBS 100 through third prism face 150, reflects from first reflective polarizer 190, and exits first PBS 100 through fourth prism face 160 as s-polarized second color light 955.

In one embodiment, first color light 941 is green light and second color light 951 is magenta light. According to this embodiment, first color-selective dichroic filter 910 is a red and blue (i.e., magenta) light reflecting and green light transmitting dichroic filter; second color-selective dichroic filter 920 is a green light reflecting and magenta light transmitting dichroic filter. According to this embodiment, the first polarization state of the blue component of second color light 951 is transmitted once by each of the reflective polarizers 190, 190'; the second polarization state of the blue component of second color light 951 is reflected once by each of the reflective polarizers 190, 190'. The single reflections are preferably front surface reflections from the blue layers, which results from orientation of the reflective polarizers 190, 190', as described elsewhere.

In one embodiment, a third color light can also be injected into the color combiner 900, as shown in FIG. 9c. In this embodiment, adjacent to first prism face 130' of second PBS 100' can be placed a quarter-wave retarder 220, a third color-selective dichroic filter, an optional light tunnel, and a third light source arranged in a manner similar to the first and second 940, 950 light sources, optional light tunnels 430, color-selective dichroic filters 910, 920 and quarter-wave retarders 220 shown in FIGS. 9a-9b. A polarization rotating reflector such as a broadband mirror 970 and quarter-wave retarder 220 are disposed facing second prism face 140 of first PBS 100. In this embodiment, none of the light rays from the first or second light sources 940, 950, pass through first prism face 130' of second PBS 100', or through second prism face 140 of first PBS 100.

In this embodiment, p-polarized third color light passes through fourth prism face 160 of first PBS 100 and fourth prism face 160' of second PBS 100'. P-polarized third color light can be rotated to s-polarized third color light by a color-selective stacked retardation filter, as described elsewhere.

Unpolarized third color light 961 from third color light source 960 passes through optional light tunnel 430, third color-selective dichroic filter 930, quarter-wave retarder 220, enters second PBS 100' through first prism face 130', and intercepts second reflective polarizer 190' where it is split into p-polarized third color light 962 and s-polarized third color light 963. P-polarized third color light 962 exits third prism face 150' of second PBS 100'.

S-polarized third color light 963 reflects from second reflective polarizer 190', leaves second PBS 100' through second prism face 140', enters first PBS 100 through first prism face 130, reflects from first reflective polarizer 190 and exits first PBS 100 through second prism face 140. S-polarized third color light 963 changes to circularly polarized light 964 as it passes through quarter-wave retarder 220, reflects from broadband mirror 970 changing state of circular polarization, changes to p-polarized third color light 965 as it passes through quarter-wave retarder 220, enters first PBS 100 through second prism face 140, passes through first reflective polarizer 190, and exits first PBS 100 through fourth prism face 160 as p-polarized third color light 965.

In another embodiment, a fourth color light (not shown) can also be injected into the color combiner 900. In this embodiment, broadband mirror 970 is instead a fourth color-selective dichroic filter 970, an optional light tunnel 430 and fourth light source (not shown) arranged in a manner similar to light sources 940, 950, 960, optional light tunnels 430, quarter-wave retarders 220, and color-selective dichroic filters 910, 920, 930 shown in FIGS. 9a-9c Third color-selective dichroic filter 930 reflects fourth color light (not shown) and transmits third color light 961; fourth color-selective dichroic filter 970 reflects third color light 961 and transmits fourth color light (not shown). In this embodiment, fourth color light also passes through third prism face 150' of second PBS 100' and fourth prism face 160 of first PBS 100 in the p-polarization state.

Light sources in a color light combining system can be energized sequentially, as described in co-pending U.S. patent application Ser. No. 60/638,834. According to one aspect, the time sequence is synchronized with a transmissive or reflective imaging device in a projection system that receives a combined light output from the color light combining system. According to one aspect, the time sequence is repeated at rate that is fast enough so that an appearance of flickering of projected image is avoided, and appearances of motion artifacts such as color break up in a projected video image are avoided.

Figure 10:
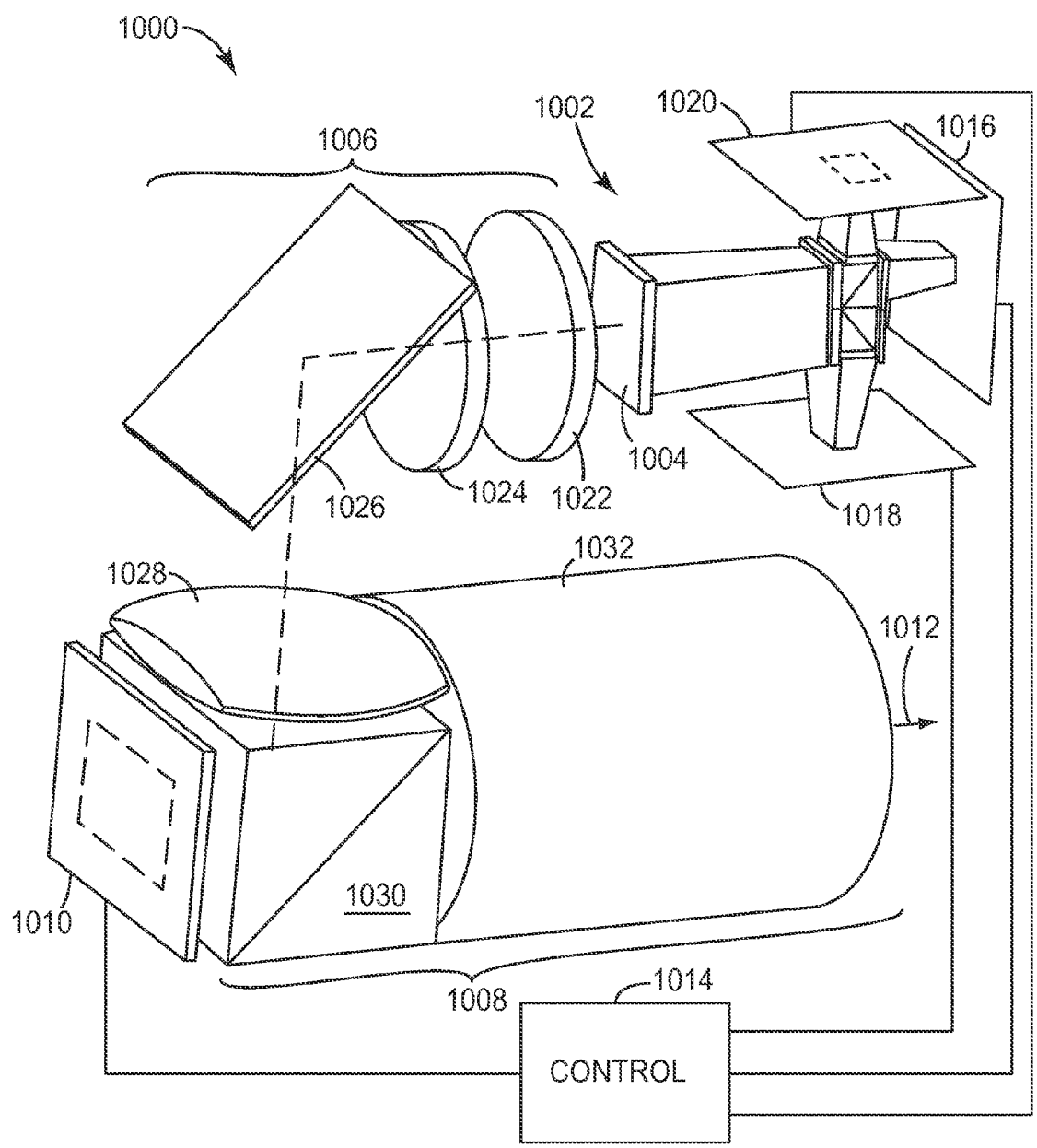
FIG. 10 is a schematic view of a projector.

FIG. 10 illustrates a projector 1000 that includes a three color light combining system 1002. The three color light combining system 1002 provides a combined light output at output region 1004. In one embodiment, combined light output at output region 1004 is polarized. The combined light output at output region 1004 passes through light engine optics 1006 to projector optics 1008.

The light engine optics 1006 comprise lenses 1022, 1024 and a reflector 1026. The projector optics 1008 comprise a lens 1028, a PBS 1030 and projection lenses 1032. One or more of the projection lenses 1032 can be movable relative to the PBS 1030 to provide focus adjustment for a projected image 1012. A reflective imaging device 1010 modulates the polarization state of the light in the projector optics, so that the intensity of the light passing through the PBS 1030 and into the projection lens will be modulated to produce the projected image 1012. A control circuit 1014 is coupled to the reflective imaging device 1010 and to light sources 1016, 1018 and 1020 to synchronize the operation of the reflective imaging device 1010 with sequencing of the light sources 1016, 1018 and 1020. In one aspect, a first portion of the combined light at output region 1004 is directed through the projector optics 1008, and a second portion of the combined light output can be recycled back into color combiner 1002 through output region 1004. The second portion of the combined light can be recycled back into color combiner by reflection from, for example: a mirror, a reflective polarizer, a reflective LCD and the like. The arrangement illustrated in FIG. 10 is exemplary, and the light combining systems disclosed can be used with other projection systems as well. According to one alternative aspect, a transmissive imaging device can be used.

According to one aspect, a color light combining system as described above produces a three color (white) output. The system has high efficiency because polarization properties (reflection for S-polarized light and transmission for P-polarized light) of a polarizing beam splitter with reflective polarizer film have low sensitivity for a wide range of angles of incidence of source light. Additional collimation components can be used to improve collimation of the light from light sources in the color combiner. Without a certain degree of collimation, there will be significant light losses associated with variation of dichroic reflectivity as a function of angle of incidence (AOI), loss of TIR or increased evanescent coupling to frustrate the TIR, and/or degraded polarization discrimination and function in the PBS. In the present disclosure, polarizing beam splitters function as light pipes to keep light contained by total internal reflection, and released only through desired surfaces.

Although the present invention has been described with reference to preferred embodiments, workers skilled in the art will recognize that changes may be made in form and detail without departing from the spirit and scope of the invention.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical element, comprising:
a first color-selective dichroic filter having a first input surface, disposed to transmit a first light beam perpendicular to the first input surface;
a second color-selective dichroic filter having a second input surface, disposed to transmit a second light beam perpendicular to the second input surface;
a third color-selective dichroic filter having a third input surface, disposed to transmit a third light beam perpendicular to the third input surface;
a first reflective polarizer disposed to intercept the first light beam and the second light beam at an angle of approximately 45 degrees;
a second reflective polarizer disposed to intercept the third light beam at an angle of approximately 45 degrees;
a reflector disposed so that a line normal to the reflector intercepts the second reflective polarizer at an angle of approximately 45 degrees; and
a first, a second, a third, and a fourth retarder disposed facing each of the first, second and third color-selective dichroic filters, and the reflector, respectively,
wherein the first and second reflective polarizers and the retarders are disposed to convert a second polarization state of the first, second and third light beam into a first polarization state of the first, second and third light beams, respectively, and
wherein each reflective polarizer comprises a polymeric multilayer optical film having blue layers disposed proximate at least one of the first, second and third color-selective dichroic filters.

2. The optical element of claim 1, wherein each reflective polarizer is aligned to the first polarization state and each retarder comprises a quarter-wave retarder aligned at an approximately 45 degree angle to the first polarization state.

3. The optical element of claim 1, wherein the first light beam comprises a first color unpolarized light, the second light beam comprises a second color unpolarized light, and the third light beam comprises a third color unpolarized light.

4. The optical element of claim 1, further comprising:
a first and a second prism forming a first polarizing beam splitter (PBS), wherein the first reflective polarizer is disposed on a first diagonal of the first PBS; and
a third and a fourth prism forming a second PBS, wherein the second reflective polarizer is disposed on a second diagonal of the second PBS.

5. The optical element of claim 1, wherein the reflector comprises:
a fourth color-selective dichroic filter having a fourth input surface, disposed to transmit a fourth light beam perpendicular to the fourth input surface,
wherein the first and second reflective polarizers and the retarders are disposed to convert the second polarization state of the first, second, third and fourth light beam into the first polarization state of the first, second, third and fourth light beams, respectively.

6. An optical element, comprising:
a first color-selective dichroic filter having a first input surface, disposed to transmit a first light beam perpendicular to the first input surface;
a second color-selective dichroic filter having a second input surface, disposed to transmit a second light beam perpendicular to the second input surface;
a third color-selective dichroic filter having a third input surface, disposed to transmit a third light beam perpendicular to the third input surface;
a first reflective polarizer disposed to intercept the first light beam and the second light beam at an angle of approximately 45 degrees;
a second reflective polarizer disposed to intercept the third light beam at an angle of approximately 45 degrees;
a half-wave retarder disposed between the first reflective polarizer and the second reflective polarizer; and
a first, a second, and a third quarter-wave retarder disposed facing each of the first, second and third color-selective dichroic filters, respectively,
wherein the first and second reflective polarizers and the retarders are disposed to convert a second polarization state of the first, second and third light beam into a first polarization state of the first, second and third light beams, respectively.

7. The optical element of claim 6, wherein the half-wave retarder is disposed to intercept the first light beam in an approximately perpendicular direction.

8. The optical element of claim 6, wherein the half-wave retarder is disposed to intercept the first light beam at an angle of approximately 45 degrees.

9. The optical element of claim 6, wherein each reflective polarizer is aligned to the first polarization state and each quarter-wave retarder is aligned at an approximately 45 degree angle to the first polarization state.

10. The optical element of claim 6, wherein the first light beam comprises a first color unpolarized light, the second light beam comprises a second color unpolarized light, and the third light beam comprises a third color unpolarized light.

11. The optical element of claim 6, further comprising:
a first and a second prism forming a first polarizing beam splitter (PBS), wherein the first reflective polarizer is disposed on a first diagonal of the first PBS; and
a third and a fourth prism forming a second PBS, wherein the second reflective polarizer is disposed on a second diagonal of the second PBS.

12. The optical element of claim 6, wherein each reflective polarizer comprises a polymeric multilayer optical film.

13. The optical element of claim 12, wherein the polymeric multilayer optical film comprises blue layers disposed proximate at least one of the first, second, and third color-selective dichroic filters.

14. An optical element, comprising:
a first color-selective dichroic filter having a first input surface, disposed to transmit a first light beam perpendicular to the first input surface;
a second color-selective dichroic filter having a second input surface, disposed to transmit a second light beam perpendicular to the second input surface;
a third color-selective dichroic filter having a third input surface, disposed to transmit a third light beam perpendicular to the third input surface;
a first reflective polarizer disposed to intercept the first light beam and the second light beam at an angle of approximately 45 degrees;
a second reflective polarizer disposed to intercept the third light beam at an angle of approximately 45 degrees;
a half-wave retarder disposed facing the third color-selective dichroic filter, opposite the second reflective polarizer; and
a first, a second, and a third quarter-wave retarder disposed facing each of the first, second and third color-selective dichroic filters, respectively, wherein the first reflective polarizer and the first and second retarders are disposed to convert a second polarization state of the first and second light beam into a first polarization state of the first and second light beam, respectively, and wherein the second reflective polarizer and the third retarder are disposed to convert a first polarization state of the first, second, and third light beam into a second polarization state of the first, second, and third light beam respectively.

15. The optical element of claim 14, wherein the half-wave retarder is adjacent the second reflective polarizer and opposite the third color-selective dichroic filter.

16. The optical element of claim 14, wherein the first reflective polarizer is aligned to the first polarization state, the second reflective polarizer is aligned to the second polarization state, and each quarter-wave retarder is aligned at an approximately 45 degree angle to the first polarization state.

17. The optical element of claim 14, wherein the first light beam comprises a first color unpolarized light, the second light beam comprises a second color unpolarized light, and the third light beam comprises a third color unpolarized light.

18. The optical element of claim 14, further comprising:
a first and a second prism forming a first polarizing beam splitter (PBS), wherein the first reflective polarizer is disposed on a first diagonal of the first PBS; and
a third and a fourth prism forming a second PBS, wherein the second reflective polarizer is disposed on a second diagonal of the second PBS.

19. The optical element of claim 14, wherein each reflective polarizer comprises a polymeric multilayer optical film.

20. The optical element of claim 19, wherein the polymeric multilayer optical film comprises blue layers disposed proximate at least one of the first, second, and third color-selective dichroic filters.

* * * * *